US012381332B2

(12) United States Patent
Andrew et al.

(10) Patent No.: US 12,381,332 B2
(45) **Date of Patent: *Aug. 5, 2025**

(54) MAGNETOELECTRIC NANOWIRE BASED ANTENNAS

(71) Applicant: University of Florida Research Foundation, Inc., Gainesville, FL (US)

(72) Inventors: Jennifer S. Andrew, Gainesville, FL (US); Matthew Bauer, Gainesville, FL (US); David P. Arnold, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/359,650

(22) Filed: Jul. 26, 2023

(65) Prior Publication Data

US 2023/0369773 A1 Nov. 16, 2023

Related U.S. Application Data

(63) Continuation of application No. 17/430,948, filed as application No. PCT/US2020/019426 on Feb. 24, 2020, now Pat. No. 11,757,198.

(60) Provisional application No. 62/810,638, filed on Feb. 26, 2019.

(51) Int. Cl.

| | |
|---|---|
| ***H01Q 15/00*** | (2006.01) |
| ***H01Q 1/36*** | (2006.01) |
| ***H01Q 21/06*** | (2006.01) |

(52) U.S. Cl.
CPC ......... *H01Q 15/0086* (2013.01); *H01Q 1/364* (2013.01); *H01Q 21/061* (2013.01)

(58) Field of Classification Search
CPC ... H01Q 15/0086; H01Q 1/364; H01Q 21/061
See application file for complete search history.

(56) References Cited

U.S. PATENT DOCUMENTS

| | | | | |
|---|---|---|---|---|
| 8,531,782 B2 * | 9/2013 | Bowers | G02B 27/40 | 343/700 R |
| 8,630,044 B2 * | 1/2014 | Bowers | G02B 27/56 | 343/909 |
| 8,634,143 B2 * | 1/2014 | Bowers | G02B 27/56 | 343/909 |

(Continued)

OTHER PUBLICATIONS

International Search Report and Written Opinion for International Application No. PCT.US2020/019426 mailed May 20, 2020.

(Continued)

*Primary Examiner* — Lam T Mai

(74) *Attorney, Agent, or Firm* — Thomas | Horstemeyer, LLP

(57) ABSTRACT

Embodiments of the present disclosure integrate magnetoelectric nanowire arrays within antenna assemblies to form ultra-compact antennas. An exemplary method comprises using a dielectrophoretic force to orient a magnetoelectric nanowire across an electrode gap separating a pair of electrodes; and transmitting or receiving electromagnetic waves through a magnetoelectric effect of the magnetoelectric nanowire. Other methods, apparatuses, and systems are also presented.

20 Claims, 23 Drawing Sheets

(56) References Cited

U.S. PATENT DOCUMENTS

| | | | | |
|---|---|---|---|---|
| 8,634,144 | B2 * | 1/2014 | Bowers | G02B 27/56 343/909 |
| 8,638,504 | B2 * | 1/2014 | Bowers | G02B 27/40 343/700 R |
| 8,638,505 | B2 * | 1/2014 | Bowers | G02B 1/007 343/700 R |
| 8,773,775 | B2 * | 7/2014 | Bowers | G02B 1/007 343/700 R |
| 8,773,776 | B2 * | 7/2014 | Bowers | G02B 27/0081 343/700 R |
| 8,817,380 | B2 * | 8/2014 | Bowers | G02B 3/00 343/700 R |
| 9,019,632 | B2 * | 4/2015 | Bowers | G02B 27/40 343/700 R |
| 9,081,123 | B2 * | 7/2015 | Bowers | G02B 1/002 |
| 9,083,082 | B2 * | 7/2015 | Bowers | G02B 27/56 |
| 9,779,865 | B2 * | 10/2017 | Wang | H01F 7/04 |
| 10,364,511 | B1 * | 7/2019 | Chen | H01Q 9/0407 |
| 11,007,281 | B2 * | 5/2021 | Wang | A61M 31/002 |
| 11,199,447 | B1 * | 12/2021 | Hu | H01S 1/02 |
| 11,757,198 | B2 * | 9/2023 | Andrew | H01Q 21/061 343/700 MS |
| 2008/0090401 | A1 * | 4/2008 | Bratkovski | H01Q 15/0006 438/597 |
| 2010/0027130 | A1 * | 2/2010 | Bowers | G02B 1/007 359/642 |
| 2010/0149660 | A1 * | 6/2010 | Bowers | G02B 27/40 343/753 |
| 2011/0043037 | A1 | 2/2011 | Mcilroy et al. | |
| 2014/0262707 | A1 * | 9/2014 | Pawashe | B82Y 10/00 200/181 |
| 2016/0329438 | A1 * | 11/2016 | Pawashe | H01L 29/045 |
| 2016/0333167 | A1 * | 11/2016 | Gray | H01L 41/16 |
| 2018/0254117 | A1 | 9/2018 | Gordon | |
| 2019/0019593 | A1 * | 1/2019 | Guo | H01L 51/5203 |
| 2019/0058264 | A1 | 2/2019 | Jung et al. | |
| 2019/0148620 | A1 * | 5/2019 | Andrew | G01R 33/07 310/26 |
| 2019/0326501 | A1 * | 10/2019 | Gilbert | H02K 55/00 |

OTHER PUBLICATIONS

Tianxiang Nan et al. "Acoustically actuated ultra-compact NEMS magnetoelectric antennas", Nature Communications, vol. 8, No. 296. pp. 1-8, 2017.

* cited by examiner

MAGNETOELECTRIC NANOWIRE BASED ANTENNAS

CROSS-REFERENCE TO RELATED APPLICATIONS

This application is continuation of co-pending U.S. utility application entitled, "Magnetoelectric Nanowire Based Antennas," having application Ser. No. 17/430,948, filed Aug. 13, 2021, which is the 35 U.S.C. § 371 national stage application of PCT Application No. PCT/US2020/019426, filed Feb. 24, 2020, which claims priority to U.S. Provisional Application No. 62/810,638, having the title "Magnetoelectric Nanowire Based Antennas," filed on Feb. 26, 2019, all of which are incorporated herein by reference in their entireties.

STATEMENT REGARDING FEDERALLY SPONSORED RESEARCH OR DEVELOPMENT

This invention was made with government support under IIP1439644 awarded by the National Science Foundation. The government has certain rights in the invention.

TECHNICAL FIELD

The present disclosure is generally related to antennas that receive and transmit electromagnetic radiation.

BACKGROUND

Modern antenna design strives to balance antenna performance and antenna size, under the constraint of system imposed fabrication/integration methods. In modern wireless communications, it is difficult to achieve good antenna performance if the size of the antenna is less than 1/10$^{th}$ the electromagnetic wavelength (e.g. a minimum of 3 cm at 1 GHz).

SUMMARY

Aspects of the present disclosure are related to a nanowire antenna array device. In one aspect, among others, the nanowire antenna array device comprises a first electrode positioned across a second electrode, wherein an electrode gap separates the first electrode and the second electrode; a magnetoelectric nanowire connected to the first electrode and the second electrode across the electrode gap without substrate clamping; wherein the nanowire antenna array device receives or transmits electromagnetic waves through the magnetoelectric effect. In various aspects, the nanowire antenna array device can operate at a mechanical resonance.

In one or more aspects, the magnetoelectric nanowire can comprise a piezoelectric material coupled with a magnetostrictive material. The piezoelectric material coupled with the magnetostrictive material can comprise barium titanate coupled with cobalt ferrite. The piezoelectric material coupled with the magnetostrictive material can comprise PZT (lead zirconate titanate) coupled with NZF (nickel zinc ferrite).

In another aspect, the nanowire antenna array device can comprise a series of magnetoelectric nanowires that span between respective pairs of electrodes, wherein the series of magnetoelectric nanowires include the magnetoelectric nanowire connected to the first electrode and the second electrode. The nanowire antenna array device cam comprise a collection of magnetoelectric nanowires having respective pairs of electrodes that are coupled in parallel with one another, wherein the collection of magnetoelectric nanowires include the magnetoelectric nanowire connected to the first electrode and the second electrode.

In various aspects, the magnetoelectric nanowire can comprise a Janus morphology. The magnetoelectric nanowire can comprises a core shell morphology. The magnetoelectric nanowire can comprise a randomly dispersed morphology or a multistrand morphology. The first electrode and the second electrode can form inter-digitated electrodes.

In one or more aspects, a wireless communication system can comprise a radio transmitter having the nanowire antenna array device. In another aspect, a wireless communication system can comprise a radio receiver having the nanowire antenna array device.

Aspects of the present disclosure are also related to a method involving magnetoelectric nanowires. Such a method comprises fabricating 1-D magnetoelectric nanofibers; forming 1-D magnetoelectric nanofibers into shorter 1-D magnetoelectric nanowires; using a dielectrophoretic force to orient a 1-D magnetoelectric nanowire across an electrode gap separating a pair of electrodes; and transmitting or receiving electromagnetic waves through a magnetoelectric effect of the 1-D magnetoelectric nanowire. In another aspect, the 1-D magnetoelectric nanowire can operate at a mechanical resonance.

In one or more aspects, the method can comprise changing the mechanical resonance frequency by adjusting a width of the electrode gap or a length of the magnetoelectric nanowire. The method can comprise changing the mechanical resonance frequency with a DC magnetic bias field. The method can comprise changing the mechanical resonance frequency by adjusting a diameter of the magnetoelectric nanowire. The method can comprise receiving electromagnetic waves through the magnetoelectric effect of the 1-D magnetoelectric nanowire at its mechanical resonance frequency.

In various aspects, the magnetoelectric nanowire is oriented with a solvent across the electrode gap using the dielectrophoretic force. The solvent can comprise water, ethanol, 2-methoxyethanol, or butanol. The magnetoelectric nanofibers can be fabricated by sol-gel electrospinning. The magnetoelectric nanowire can comprise a piezoelectric material coupled with a magnetostrictive material.

In one or more aspects of the method, the magnetoelectric nanowire can comprises a Janus morphology. The magnetoelectric nanowire can comprises a core shell morphology. The magnetoelectric nanowire can comprises a randomly dispersed morphology or a multistrand morphology. The pair of electrodes can form inter-digitated electrodes. In another aspect, the method can comprise forming a sacrificial metal coating on the magnetoelectric nanowire. The metal can comprise copper.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure integrate magnetoelectric nanowire arrays within antenna assemblies to form ultra-compact antennas. In accordance with techniques of the present disclosure, magnetoelectric nanowires can be assembled using dielectrophoresis onto interdigitated electrodes.

Conventional compact antennas generally rely on electromagnetic wave resonance, which leads to antenna sizes that are comparable to the electromagnetic wavelength. Therefore, modern antenna design strives to balance antenna performance and antenna size, under the constraint of system imposed fabrication/integration methods. With modern antenna designs relying on electromagnetic wave resonance, it is difficult to achieve good antenna performance if the size of the antenna is less than $1/10^{th}$ the electromagnetic wavelength (e.g. minimum of 3 cm at 1 GHz). As a result, miniaturization of antennas has been a technical challenge, in which pervasive wireless connectivity is important in today's interconnected world. For example, many MHz-GHz communication systems require antennas with physical sizes that can be much larger than the entire size of the system.

Accordingly, the present disclosure describes systems and methods for developing ultra-compact antennas, where the antenna size is much smaller than the electromagnetic wavelength. The breakthrough approach of the present disclosure is radically different than traditional conductive-wire type antennas. Rather than relying on a moving charge to enact antenna functionality, antennas of the present disclosure make use of functional materials. For example, embodiments of antennas in accordance with the present disclosure utilize magnetoelectric composite nanowires (strain-coupled piezoelectric+magnetostrictive materials) that respond to an electromagnetic field by directly producing a voltage. This is a material effect, rather than a purely electromagnetic effect. Accordingly, such magnetoelectric antennas receive and transmit electromagnetic waves through the magnetoelectric effect at their mechanical resonance frequencies which can be significantly lower than electrical resonance frequencies. For example, the mechanical wavelength of an exemplary antenna in accordance with the present disclosure is orders of magnitude shorter than the electromagnetic wavelength at the same frequency leading to orders of magnitude in reduced antenna size.

An exemplary antenna of the present disclosure receives and transmits electromagnetic waves through a strong strain mediated coupling in composite magnetoelectric nanowires by spanning or suspending magnetoelectric nanowires above a substrate across electrodes (without clamping). Thus, by reducing substrate clamping, magnetoelectric coupling is enhanced when compared to layered thin-film architectures (that suffer from substrate clamping which reduces their magnetoelectric effect).

Figure 1A:
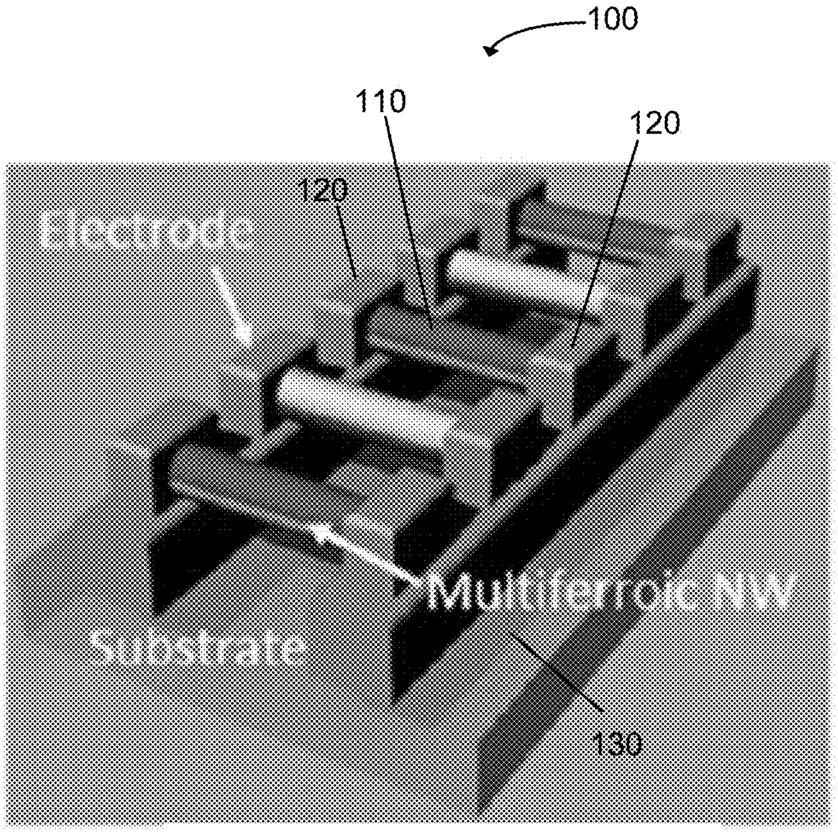
FIG. 1A is a diagram of a magnetoelectric nanowire antenna array comprising a magnetoelectric nanowire spanning across electrodes in accordance with embodiments of the present disclosure.

In a composite magnetoelectric structure, the magnetoelectric coupling originates from the strain transfer across a shared interface between a magnetostrictive and a piezoelectric material (see FIG. 1A). In a thin film arrangement, this strain transfer is limited due to the substrate acting as a mechanical clamp. However, this limitation can be overcome with magnetoelectric nanofibers, which are free of substrate based constraints, and have been theoretically modeled to have magnetoelectric coupling that is three orders of magnitude greater than their thin film counterparts.

For example, one exemplary embodiment of an antenna device of the present disclosure is formed of biphasic magnetoelectric nanowires having piezoelectric and magnetostrictive phases (e.g., ferroelectric lead zirconate titanate (PZT) and ferromagnetic nickel zinc ferrite (NZF) nanowires (PZT-NZF nanowires)) suspended across electrodes. Such nanowire morphology offers enhanced magnetoelectric effects in comparison to thin film or bulk alternatives due to a reduction in substrate clamping, and greater surface area and reduction in impurities, respectively. Due to the electric—magnetic—mechanical coupling in the material, an operating range near the mechanical resonance modes in the material can be at a much lower frequency than a traditional antenna of a similar size and can be effective at transmitting and receiving electromagnetic signals outside of these regions of mechanical resonance. Therefore, this mechanical coupling allows antennas to be fabricated that require a footprint that is ~10× smaller in size compare to a conventional antenna. Additionally, antenna performance can be dramatically enhanced by tuning the mechanical/acoustic resonance of the device to a target frequency band.

In accordance with the present disclosure, an exemplary embodiment of the present disclosure is directed to an ultra-compact antenna assembly utilizing magnetoelectric nanowires with enhanced magnetoelectric coupling. In one embodiment, nanowires are arranged across a gap separating opposing electrodes, such as inter-digitated electrodes, among others. In one embodiment, the nanowires are assembled with a solvent to arrange the nanowires suspended across the gap of the electrodes using dielectrophoretic force. In particular, the nanowires can be assembled to formed ordered arrays on the inter-digitated electrodes using dielectrophoresis and the creation of electrical contacts, in one embodiment.

In dielectrophoresis, a nanowire placed in an AC electric field becomes polarized relative to its medium and the resulting dipole experiences a force along the gradient of the electric field. In a nonuniform electric field, the force on one end of the dipole is greater than the other end, resulting in a net force called the dielectrophoretic force. As the dielectrophoretic force is determined by the electrical properties of the nanowires and the solvent used, adjusting these properties may improve or alter performance of various embodiments.

Although single phase magnetoelectrics exist, they are comparatively rare. On the other hand, composite magnetoelectrics are capable of producing greater magnetoelectric effects. For magnetoelectrics, the figure of merit is the magnetoelectric coefficient (a), which is quantified as the magnitude of the electric field (dE) generated in the material in response to an applied magnetic field (dH), $\alpha = dE/dH$.

Composite magnetoelectrics are typically comprised of magnetostrictive and piezoelectric phases which share an interface. When exposed to an applied magnetic field, the magnetostrictive phase undergoes a shape change, which in turn imparts a strain to the piezoelectric phase, thereby inducing an electrical polarization. When magnetoelectric composites are fabricated as thin films, the strain transfer between the magnetostrictive and piezoelectric phases is limited by the underlying substrate leading to a reduction in the magnetoelectric effect. As such, less rigidly clamped 1-D magnetoelectric nanostructures can offer increased magnetoelectric coefficients. Enhancements of up to a few orders of magnitude are feasible based on theoretical and preliminary scanning probe microscopy measurements. Thus, to make use of magnetoelectric nanowires demands, nanomanufacturing processes are contemplated that enable (a) the synthesis of nanowires with controlled length, (b) the ability to direct the assembly of these nanowires into ordered arrangements while avoiding substrate clamping effects, and (c) the ability to make suitable electrical connections to one or more nanowires.

In accordance with the present disclosure, embodiments of an antenna array component or device 100 of a wireless communication system are fabricated from one or more magnetoelectric biphasic fibers 110 connected to electrodes 120 (FIG. 1A) and thereby utilize the increased magnetoelectric coefficients that such 1-D structures offer. Specifically, in one embodiment, the barium titanate and cobalt ferrite system is selected for the 1-D magnetoelectric structure, as it has a significant magnetoelectric effect in bulk and thin film form. In particular, a bilayer, Janus, morphology is chosen to promote the bending mode in the magnetoelectric. Other embodiments may utilize different materials for the 1-D magnetoelectric structure, e.g., nanowire, such as a composite of PZT (lead zirconate titanate) and nickel zinc (NiZn) ferrite materials, among others. In various antenna designs, ferroelectric lead zirconate titanate (PZT) and ferromagnetic nickel zinc ferrite (NZF) nanowires (PZT-NZF nanowires) are formed using lead acetate trihydrate, zirconium n-butoxide, and titanium isopropoxide precursors for the PZT phase and ferric nitrate, nickel nitrate, zinc nitrate precursors for the NZF phase.

To fabricate the device 100, an exemplary method is implemented by (1) fabricating 1-D magnetoelectric nanofibers; (2) forming 1-D magnetoelectric nanowires 110 from the 1-D magnetoelectric nanofibers; (3) orienting the 1-D magnetoelectric nanowires 110 across electrodes 120 (without clamping); and (4) establishing upper electrical contacts. During testing, the magnetoelectric sensitivity (dV/dH) of the resultant antenna array device 100 can be measured.

Figure 1B:
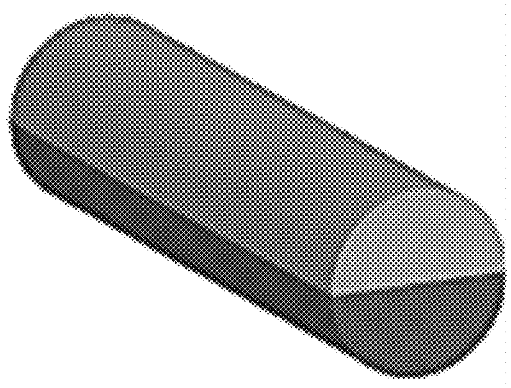
FIG. 1B-1E are diagrams of nanowire morphologies having a respective Janus morphology, a randomly dispersed morphology, a multistrand morphology, and a core shell morphology in accordance with various embodiments of the present disclosure.
Figure 1C:
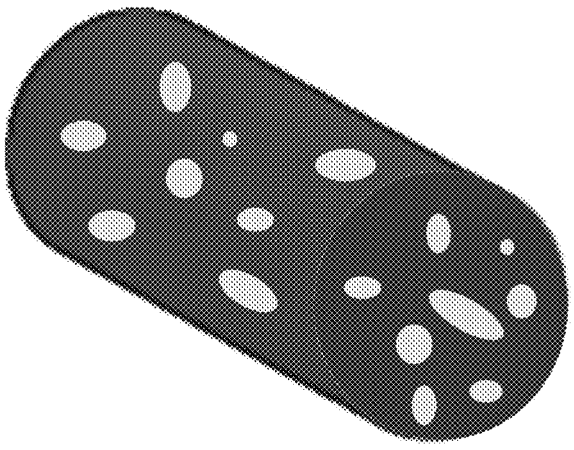
Figure 1D:
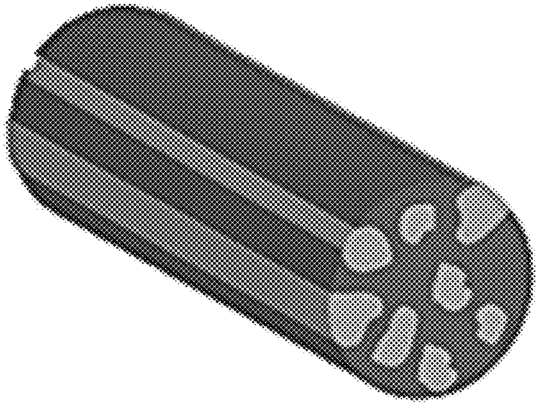
Figure 1E:
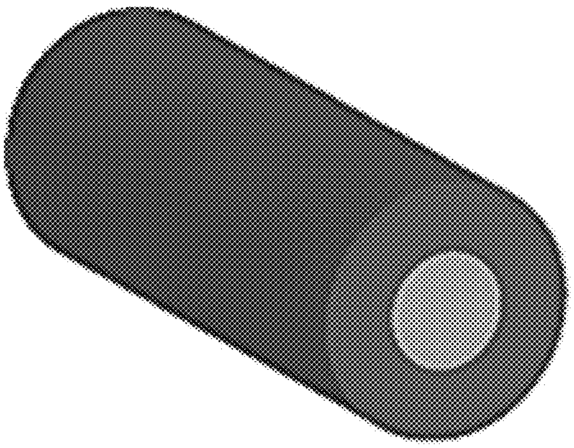

Several methods exist to fabricate 1-D magnetoelectrics including sol-gel electrospinning, hydrothermal synthesis, and various chemical and physical vapor deposition processes. In one embodiment of the present disclosure, sol-gel electrospinning is used to fabricate the 1-D magnetoelectrics, as it is capable of producing magnetoelectrics with a wide range of compositions and various interconnectivities including, but not limited to, fibers with Janus, core shell, and randomly dispersed morphologies. For illustration, FIG. 1B is a diagram depicting a nanowire with a Janus morphology, FIG. 1C depicts a randomly dispersed morphology, FIG. 1D depicts a multistrand morphology, and FIG. 1E depicts a core shell morphology for a nanowire in accordance with various embodiments of the present disclosure. While the Janus morphology and the core shell morphology shown in the figures may be interpreted as featuring one strand of a composite material, such as cobalt ferrite, and one strand of another composite material, such as barium titanate, the multistrand morphology of FIG. 1D features multiple strands of at least one of the two composite materials, such as multiple strands of cobalt ferrite and/or multiple strands of barium titanate.

The following exemplary method describes steps for fabricating a nanowire using sol-gen electrospinning in accordance with one non-limiting embodiment. Other alternative sol-gel electrospinning techniques may also be performed in accordance with the present disclosure in order to fabricate the resultant nanofibers and nanowires.

In sol-gel electrospinning, a ceramic/polymer solution is drawn, often from a syringe needle, into a nanofiber using a large electric field applied between the solution and a counter electrode. For example, as the sol-gel is extruded from the syringe needle, a surface charge forms due to the applied electric field. Once the solution accumulates a sufficient charge, it is pulled toward the counter-electrode in a shape referred to as a Taylor cone, emitted from the cone from the electrostatic force between the charged sol-gel and counter electrode as a polymer/ceramic precursor jet, and accelerated toward the counter-electrode by the applied electric field forming amorphous nanofibers. The morphology of the fibers are controlled by solution and electrospinning parameters, in which the solution parameters include viscosity, conductivity, and dielectric constant, and the electrospinning parameters included applied field, flow rate, and humidity, among others. A high temperature calcination step is utilized to burn off the polymer in the electrospinning solution and crystallize the ceramics used. In particular, a calcination step with a fast ramp rate may be used to quickly burn off the polymer from the fibers, shrinking them axially, and breaking them apart into shorter nanowires. The dimensions of the nanowires can be controlled by the electrospinning field and calcination ramp rate.

Next, an exemplary method for fabricating magnetoelectric nanofibers in accordance with the present disclosure is described. First, the barium titanate and cobalt ferrite sol-gel precursor solutions are prepared. In particular, a barium titanate ceramic solution may be prepared by dissolving 0.4246 g barium acetate in 3 ml acetic acid at 80° C. under constant stirring, followed by cooling to room temperature. After approximately 1 hour, 0.4925 ml of titanium isopropoxide may then be added. Simultaneously, a polymer solution may be prepared by dissolving 0.4 g polyvinylpyrrolidone in 3 ml ethanol under constant stirring. After an additional hour, the ceramic solution can be added dropwise to the polymer solution under constant stirring.

Similarly, a cobalt ferrite ceramic solution can be prepared by dissolving 0.48373 g cobalt nitrate hexahydrate and 1.342 g ferric nitrate nonahydrate in 2 ml of acetic acid and 0.75 ml ethanol. After stirring for approximately 1 hour, 0.412 ml acetylacetone may be added. Simultaneously, a polymer solution can be prepared by dissolving 0.4 g polyvinylpyrrolidone in 3 ml ethanol. After an additional hour, the ceramic solution may then be added dropwise to the polymer solution under constant stirring.

Figure 2:
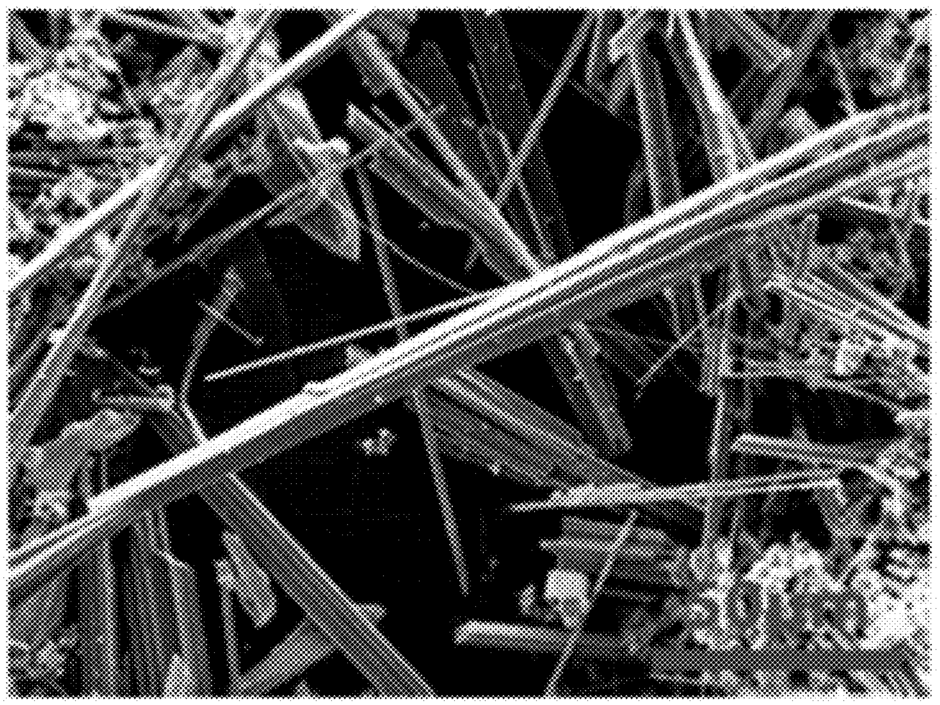
FIG. 2 is a scanning electron microscope image of an as calcined magnetoelectric nanowire in accordance with embodiments of the present disclosure.

Thereafter, both solutions are co-electrospun side by side to form Janus nanofibers, with one hemisphere of the fiber containing cobalt ferrite and the other barium titanate. To prevent sintering together of nearby nanowires, the ceramic/polymer Janus nanofibers are then calcined (e.g., in sodium chloride), thereby burning off the polymer, shrinking the fibers, and breaking them along their length, and crystallizing the amorphous as-spun ceramic at 1100° C. After salt calcination, the salt and nanowires may be immersed in water to dissolve the salt, and then, the nanowires may be removed from the water and salt solution. A dilute hydrochloric acid (HCl) wash may be used to remove remaining barium carbonate (BCO) that forms on the surface of nanowires. For illustration, FIG. 2 shows a scanning electron microscope image of an as calcined nanowire 110 in accordance with an embodiment of the present disclosure.

As discussed, a calcination step with a fast ramp rate may be used to quickly burn off the polymer from the fibers. For assembly a nanowire slightly longer than the electrode gap is desirable since the nanowire must bridge the electrode gap for electrical connections to be made and nanowires which are too long may quickly settle out of solution. As such, electrospinning and calcination parameters can be selected to provide control of the nanowire lengths. Two such parameters in various embodiments are the electrospinning voltage, as a means to control the as-spun fiber diameter and calcination ramp rate. Though these are not the only parameters which could control nanowire length, they can be readily applied to other systems.

Figure 3:
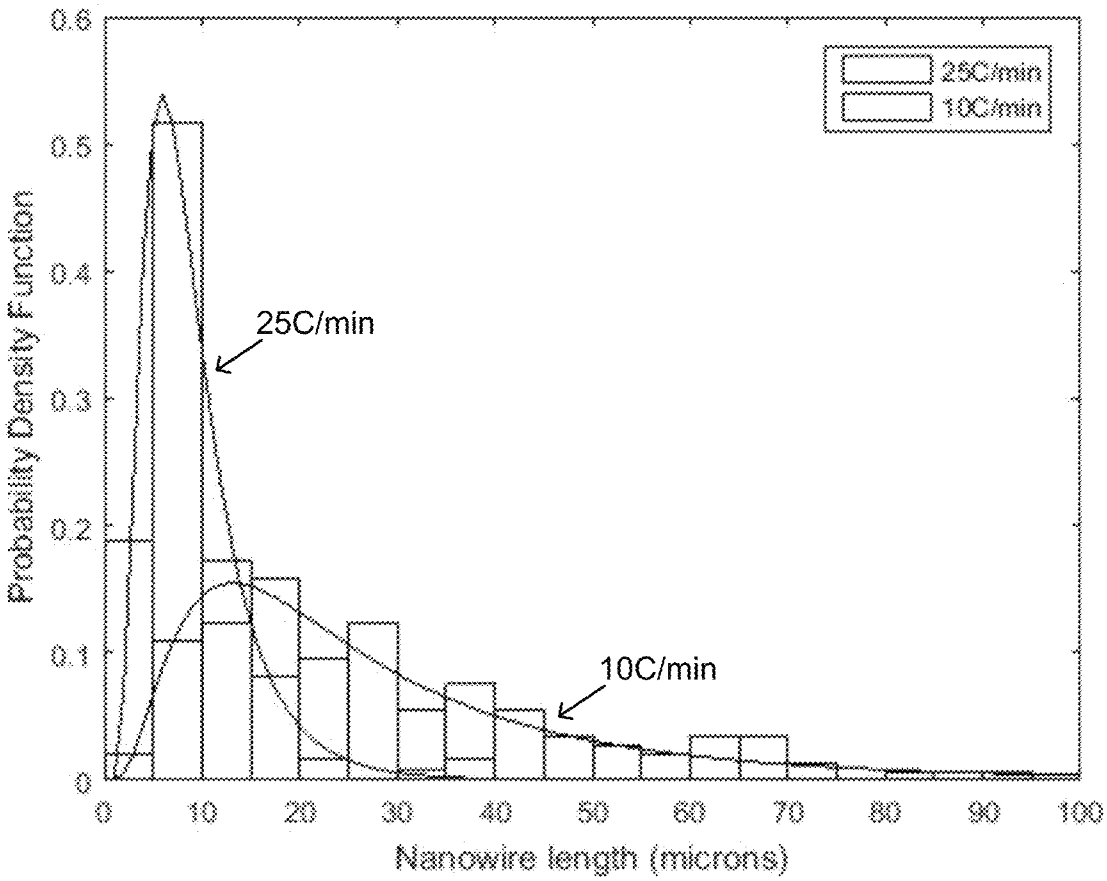
FIG. 3 is a graph illustrating the relationship between nanowire lengths and calcination ramp rates during magnetoelectric nanowire fabrication in accordance with embodiments of the present disclosure.

Correspondingly, FIG. 3 shows a decrease in magnetoelectric nanowire lengths during testing when the calcination ramp rate is increased from 10° C. $min^{-1}$ to 25° C. $min^{-1}$ which is demonstrative in showing that an increased ramp rate leads to faster polymer burn off, increases the rate of shrinkage along the axis of the nanowire and axial tension, and leads to the breakup of the fibers into shorter nanowires. FIG. 3 shows a decrease in nanowire lengths from 29.06 μm±19.34 μm to 19.34 μm±6.08 μm when the calcination ramp rate was increased from 10° C. $min^{-1}$ to 25° C. $min^{-1}$. Correspondingly, as-spun nanofibers with larger diameters may in turn produce longer nanowires.

The electrospinning voltage can be readily tuned to control the fiber diameter, where higher electrospinning voltages result in smaller diameter fibers. This is because an increase in applied field should produces a larger elongating force on the fiber jet during electrospinning, leading to smaller diameter nanofibers, which given the same calcination ramp rate would form similar aspect ratio, and thus shorter nanowires.

Figure 4:
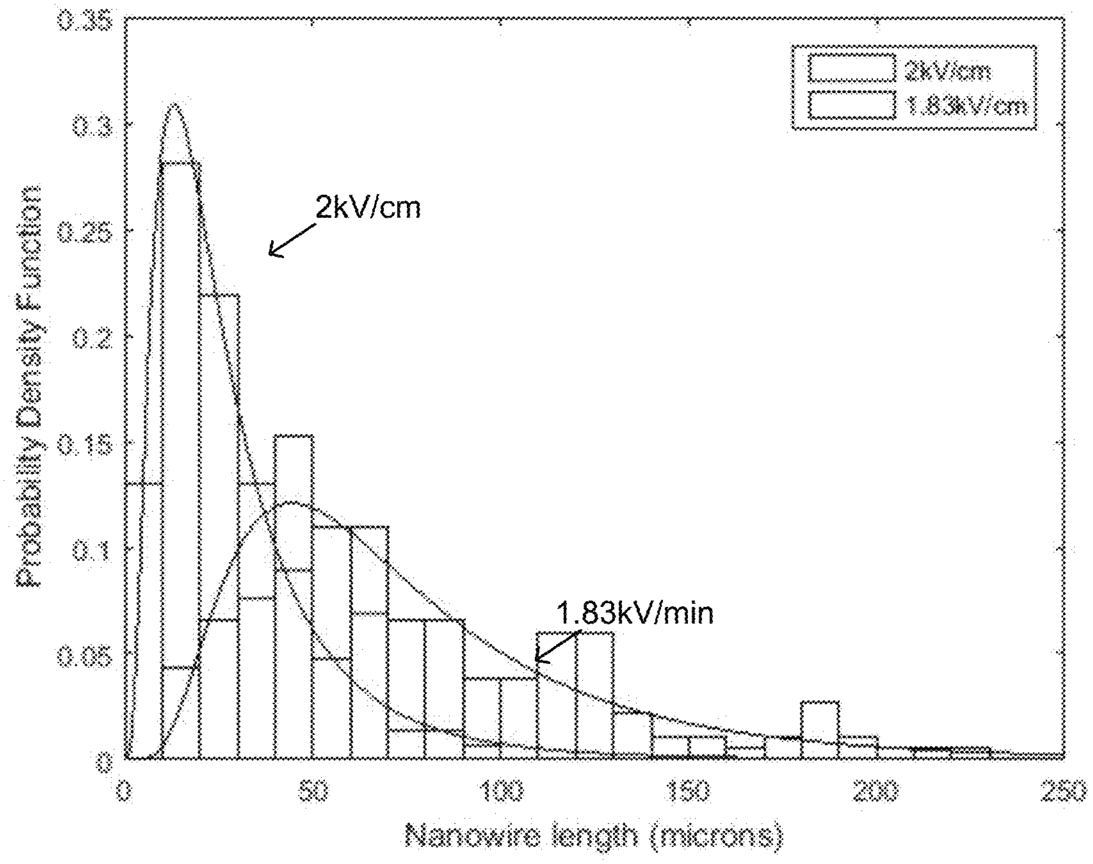
FIGS. 4-5 are graphs illustrating the relationships between nanowire lengths and electrospinning voltage and/or nanowire diameters during electrical assembly of magnetoelectric nanowire fabrication in accordance with embodiments of the present disclosure, in which FIG. 4 provides a plot of probability density function versus nanowire lengths and FIG. 5 provides a plot of nanowire lengths versus nanowire diameters.
Figure 5:
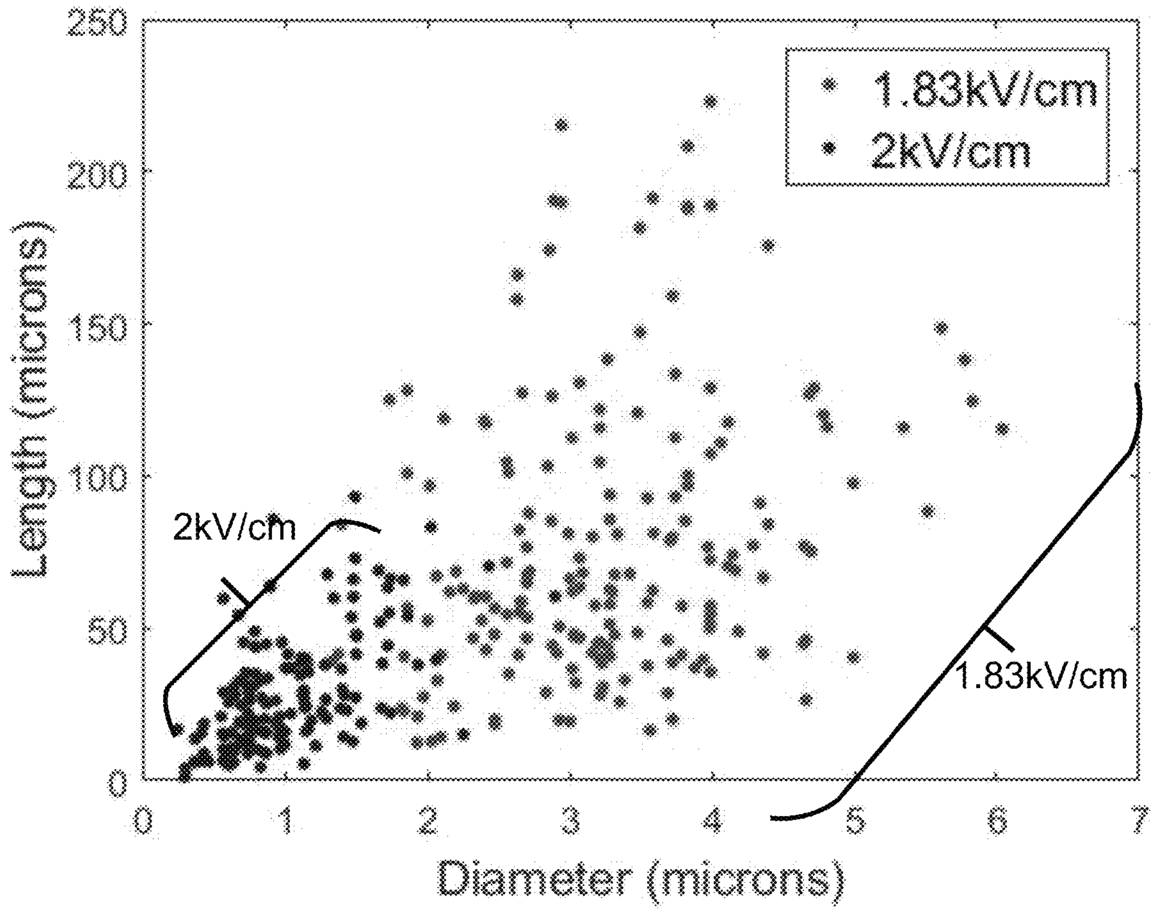

Accordingly, FIGS. 4-5 show that an increase in electrospinning voltage from 1.83 kV $cm^{-1}$ to 2 kV $cm^{-1}$ leads to the formation of smaller diameter nanofibers, which given the same calcination ramp rate form a similar aspect ratio, and thus shorter nanowires. Correspondingly, FIGS. 4-5 demonstrate that a decrease in electrospinning field from 2 kV $cm^{-1}$ to 1.83 kV $cm^{-1}$ resulted in longer nanowires, increasing the length from 29.06 μm±19.34 μm with 2 kV $cm^{-1}$ to 77.43 μm±46.11 μm with 1.83 kV $cm^{-1}$, and larger diameter fibers with similar aspect ratios. This is also supported by the positive correlation coefficient between nanowire length and diameter as shown in FIG. 5 of $R=0.604$ with a p-value of $p<0.01$ (>99% confidence level). It is also important to note the heteroskedasticity in FIG. 5; i.e. that an increasing nanowire diameter is positively correlated with increased nanowire length, but also increased length variation. This makes long nanowires, if desirable, currently more difficult to fabricate. In accordance with various embodiments, nanowires having diameters of 10 nm to 1000 nm (or larger) can be fabricated in accordance with the present disclosure. However, exemplary nanowires of the present disclosure are not limited to these dimensions.

Figure 6:
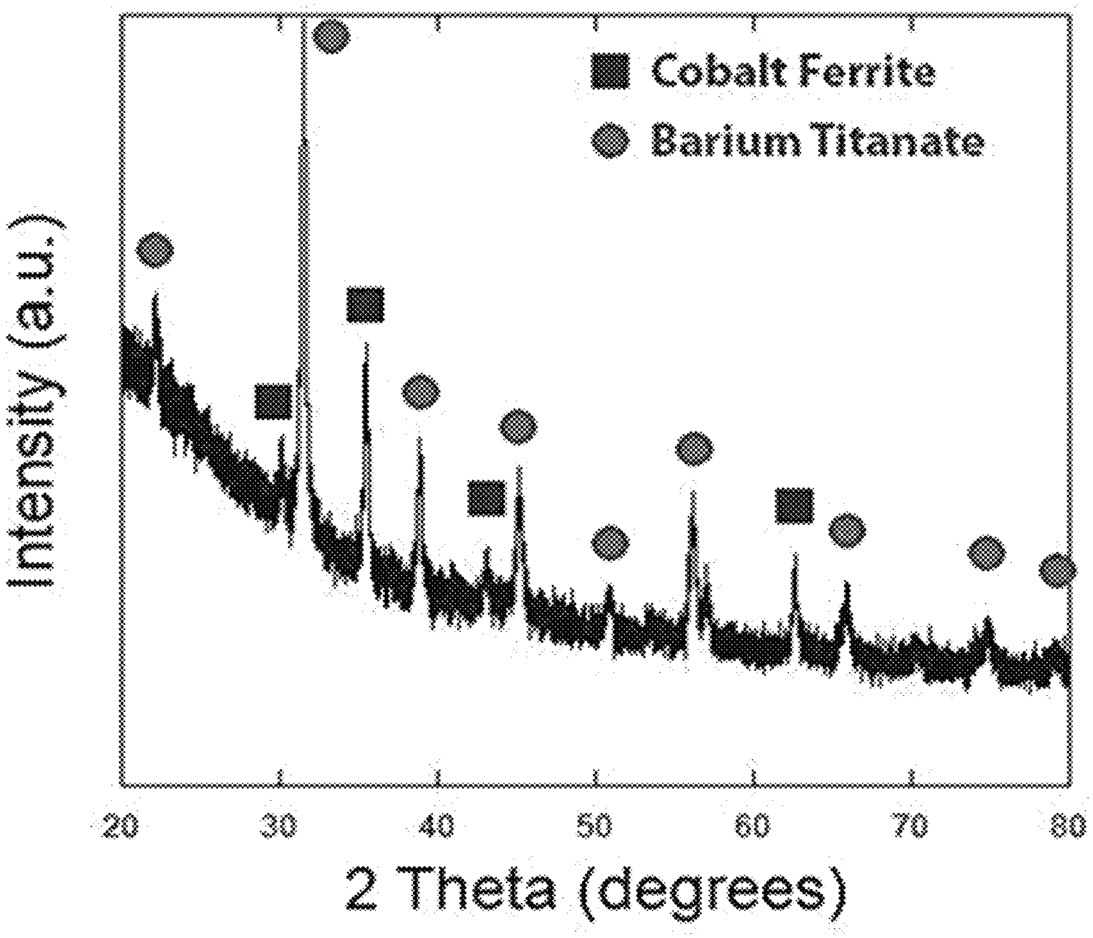
FIG. 6 depicts an X-ray diffraction spectra analysis of calcined barium titanate and cobalt ferrite nanowires in accordance with embodiments of the present disclosure.
Figure 7:
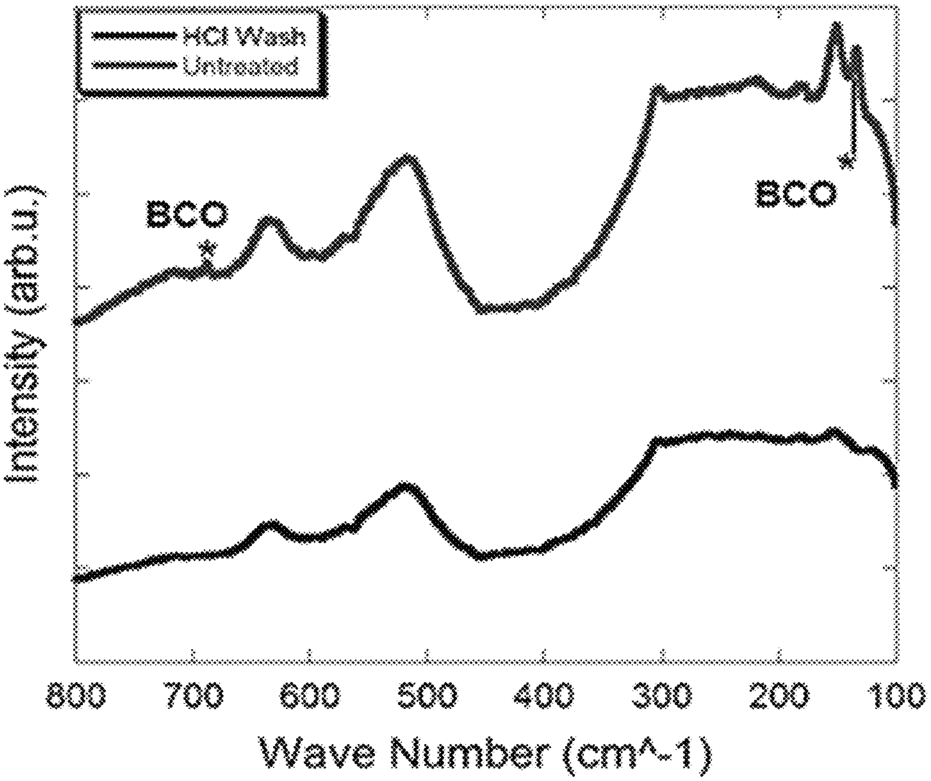
FIG. 7 depicts a Raman spectra analysis of single phase barium titanate nanowires used to test a process for removing barium carbonate impurities in accordance with embodiments of the present disclosure.

To verify the crystal structure of the calcined barium titanate and cobalt ferrite nanowires, X-ray diffraction (XRD) was performed, as depicted in FIG. 6. Then, the results were analyzed using Rietveld refinement. From this, the fibers were found to be comprised of 62 wt % tetragonal barium titanate, P4 mm, and 38 wt % spinel cobalt ferrite, Fd-3m. The agreement indices of the refinement, $R_{expected}$=5.19, $R_{weighted}$=5.49, and $X^2$=1.26, indicate that these are indeed the structures present and that there are low levels of or no crystalline impurities. Though XRD showed no impurities, barium carbonate surface impurities have been observed in as-calcined barium titanate nanowires formed via sol gel electrospinning. The removal of this impurity was tested via acid treatment with dilute HCl in single phase barium titanate nanowires using Raman spectroscopy, in which single phase wires were used for this test so that any signal from the cobalt ferrite phase would not obscure the barium carbonate peaks. From FIG. 7, one may see that the barium titanate phase contains barium carbonate peaks which are no longer present after acid treatment, showing that a dilute HCl treatment can remove the barium carbonate impurity from the as-calcined wires.

To assemble the magnetoelectric Janus nanowires across parallel electrodes, they may be dispersed in a solution and assembled utilizing an AC electrical assembly technique. To position the nanofibers across parallel electrodes 120 in one embodiment, a method which would not expose the substrate 130 to high temperatures required for calcination is desired. Correspondingly, while lower thermal treatment or calcination temperatures can be used, this would be at the expense of the ferroelectric and magnetostrictive properties of the barium titanate and cobalt ferrite, respectively. Therefore, a generalizable approach to avoid damage to wireless communication device or chip components while allowing calcination to be performed at an optimal temperature for any arbitrary magnetoelectric system is implemented by first performing calcination off-chip then subsequently assembling them for the antenna array device 100 in certain embodiments. For example, when combined with a bottom up assembly technique, the high temperature calcination step can be performed off substrate making it CMOS compatible and feasible for application in a manufacturing setting. Accordingly, by performing the high-temperature operations off substrate, more integrated circuitry can be placed on the same chip without worrying about exposing the chip to high temperatures. Additionally, assembled devices are not restricted to semiconductor substrates that have patterned metal electrodes. For example, assembled devices can utilize non-silicon substrates such as paper, flexible/stretchable substrates, textiles, etc. Likewise, magnetoelectric nanowires can be assembled separately rather than being built directly on the substrate, in accordance with various techniques of the present disclosure.

In AC electrical assembly, a magnetoelectric nanowire, or particle, suspended in solution spontaneously forms a dipole, and experiences a force along the gradient of the electric field referred to as the dielectrophoretic force. Other forces present include dipole-dipole interactions, electrostatics, capillary forces, and AC-electroosmosis. These other forces can cause repulsion or chaining between nearby nanowires, adhesion to the substrate, disruption of nanowires upon drying, and a flow of solvent around the nanowires, respectively, to varying extents depending on the assembly parameters, such as the electrical and rheological properties of the nanowires and solvent. As AC electrical assembly is highly dependent on the electrical properties, namely conductivity and permittivity, of the solvent and particles used, electrical assembly of the Janus nanowires may be attempted in various solvents for different embodiments that include water, ethanol, 2-methoxyethanol, and butanol.

Figure 8:
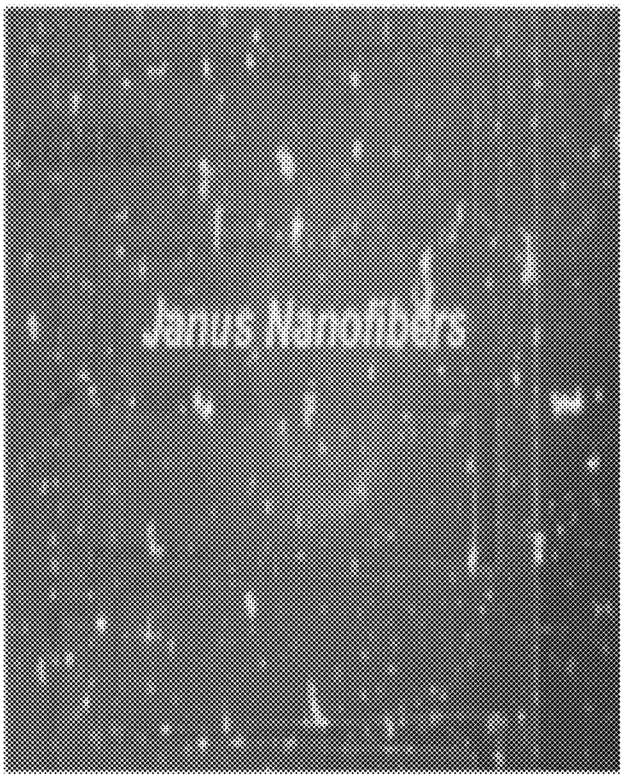
FIGS. 8-10 are images of electrical assembly of magnetoelectric nanowires using various solvents in accordance with embodiments of the present disclosure, in which an ethanol solvent solution was used for FIG. 8, a 2-methoxyethanol solvent solution was used for FIG. 9, and a butanol solvent solution was used for FIG. 10.
Figure 9:
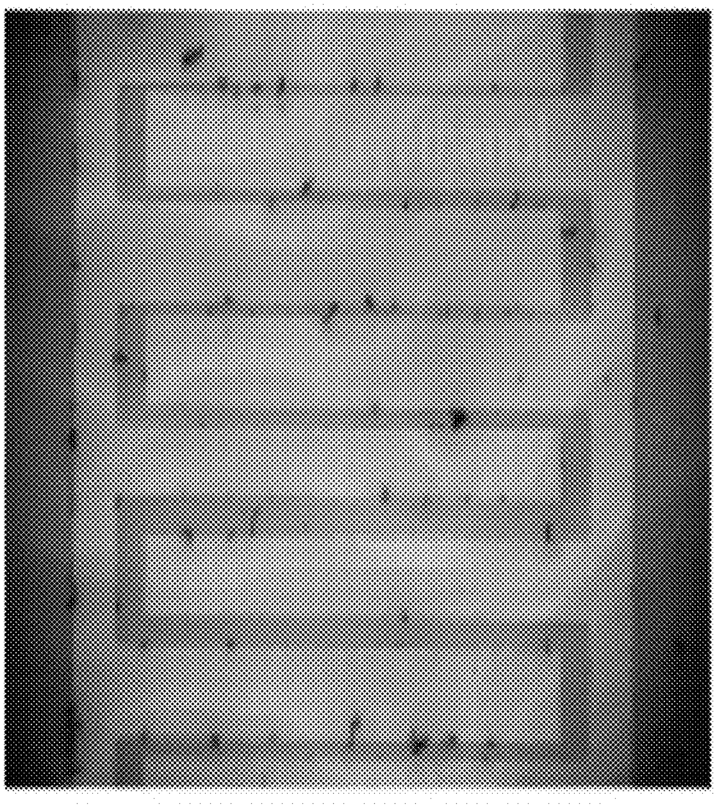
Figure 10:
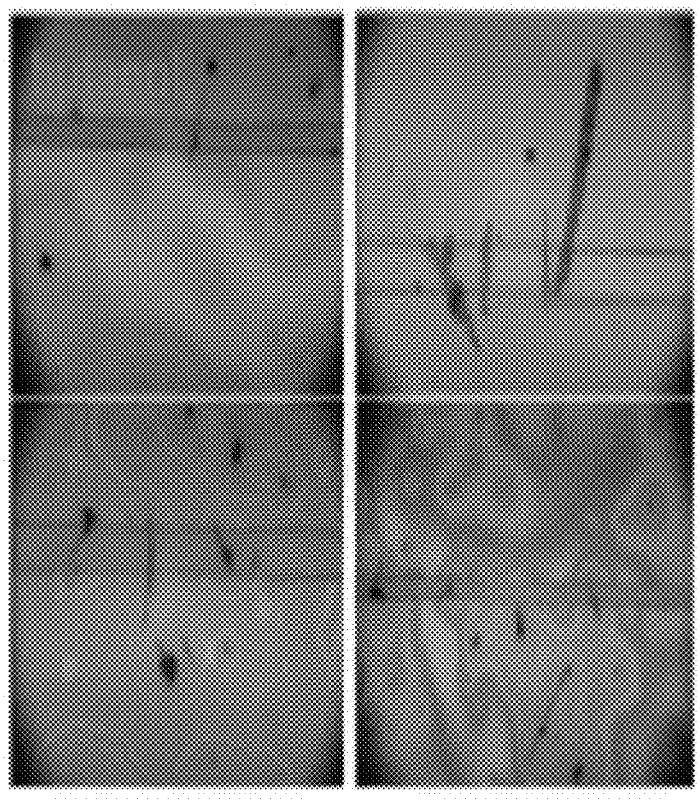
Figure 11:
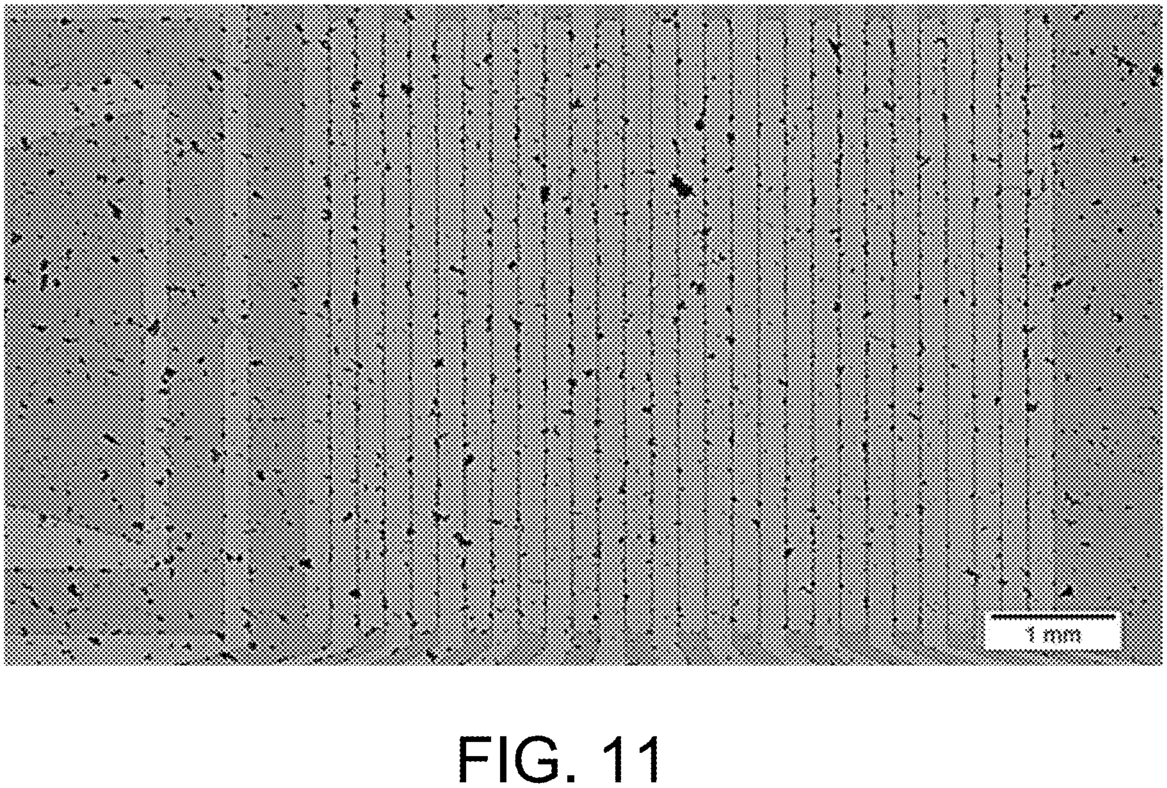
FIG. 11 is a scanning electron microscope image of an assembly of Janus nanowires in butanol in accordance with embodiments of the present disclosure.

In some embodiments, permittivity of the solution relative to the magnetoelectric nanowires is decreased in order to promote an increase in the dielectrophoretic force. Thus, assembly is performed in solutions of ethanol (FIG. 8), 2-methoxyethanol (FIG. 9), and butanol (FIG. 10), in various embodiments. During trials, assembly in each of these solvents showed good positive dielectrophoresis; however the ethanol evaporated rather rapidly, not allowing much time for assembly to occur. As such, butanol was selected for the subsequent assemblies which led to good assembly in the test arrays which allowed individual nanowire rows to be measured (FIG. 11).

During subsequent trials, good assembly was observed when most of the nanowires received a sufficiently thick metal coating (e.g., copper) along each section of their lengths on one side. Further, removing a barium carbonate ($\varepsilon_r \approx 8.5$) impurity from the Janus nanofibers/wires slightly improved assembly, and greatly improved assembly of single phase barium titanate fibers.

Therefore, in various embodiments, nanowires 110 are assembled after first coating them in a sacrificial metal coating (e.g., copper) which can be later removed from the wires post assembly. In an exemplary embodiment, a goal to obtain improved assembly guided by the dielectrophoretic (DEP) force equation for a sphere with ohmic loss is given as follows:

$$<\bar{F}_{DEP} \geq 2\pi\varepsilon_m R^3 \mathrm{Re}[K(\omega)]\nabla E^2_{RMS} \qquad \text{(Eq. 1)}$$

where the $2\pi R^3$ is the shape factor related to the spherical geometry and $\nabla E$ is the gradient of the applied electric field. The complex Clausius Mossotti factor $$K(\omega)=(\varepsilon_p-\varepsilon_m-j(\sigma_p-\sigma_m)/\omega)/(\varepsilon_p+2\varepsilon_m-j(\sigma_p+2\sigma_m)/\omega) \qquad \text{(Eq. 2)}$$

determines the direction of the dielectrophoretic force with Re(K)>0 giving the desired positive dielectrophoretic force, which is an attraction of the nanowires toward the electric field gradient maxima, i.e. the corners of the electrodes. The subscripts p and m denote the particle and medium, respectively, and $\varepsilon$ and $\sigma$, denote their permittivity and conductivity, respectively.

As can be seen from Equation 1, the dielectrophoretic force is dependent on the frequency and magnitude of the applied AC electric field as well as the electrical permittivity and conductivity of the particle/nanowire in solution and the solvent used. As such, one can tune these electrical factors to obtain strong positive dielectrophoresis, attraction of the magnetoelectric nanowires 110 across the electrode gap, weak dielectrophoresis, or even negative dielectrophoresis repulsion of the nanowires from the electrode gap. In general conductive wires or particles tend to exhibit positive dielectrophoresis below a certain cutoff frequency, $\omega=(\sigma_p+2\sigma_m)/(\varepsilon_p+\varepsilon_m)$, and dielectrics with high permittivities, compared to the solvent used, tend to exhibit positive dielectrophoresis above this cutoff frequency.

Figure 12:
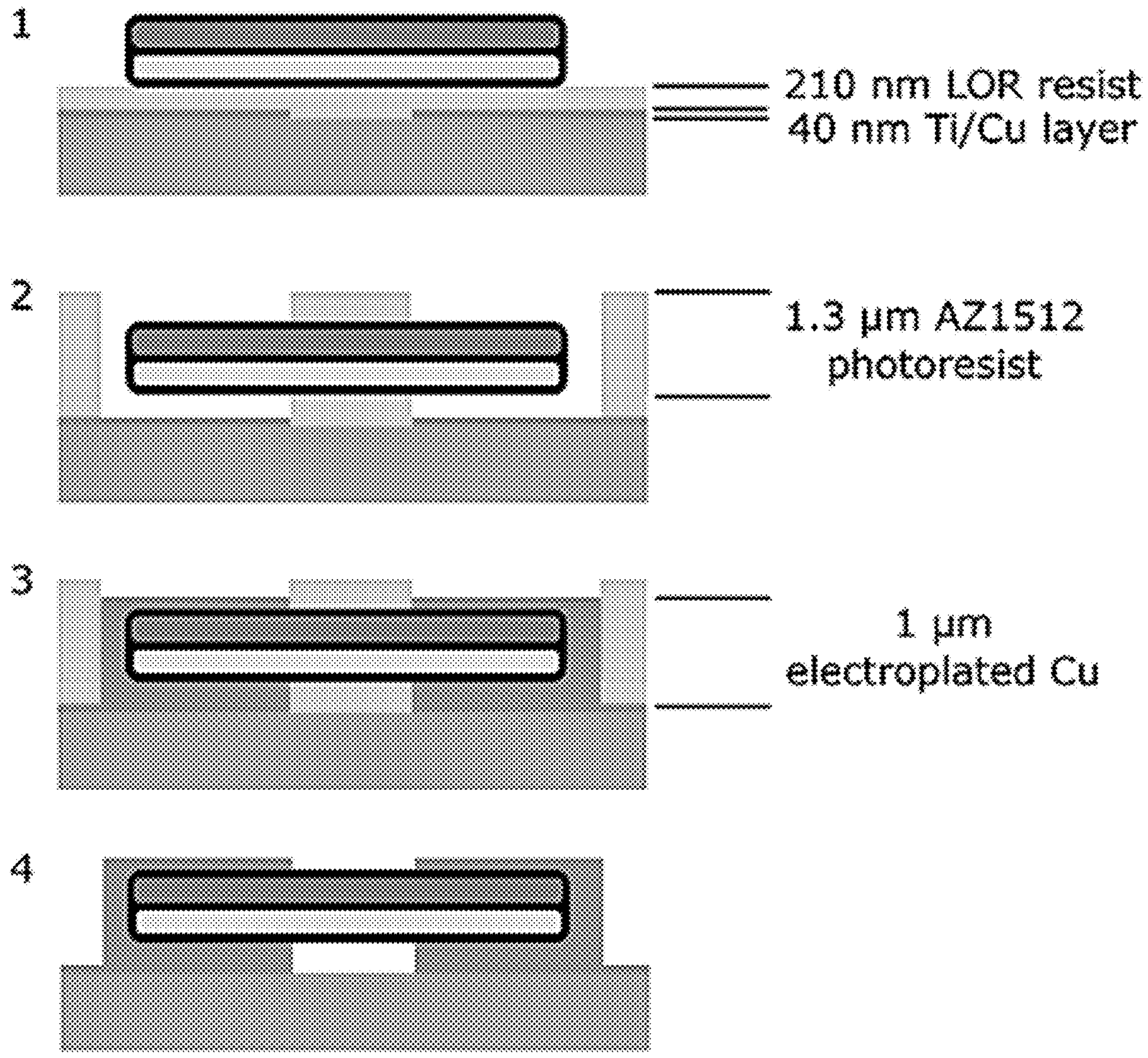
FIG. 12 is a flow diagram illustrating a formation of upper electrical contacts across the nanowires in accordance with embodiments of the present disclosure.

In an attempt to optimize the frequency for electrical assembly during testing, the frequency from 100 Hz-10 MHz was swept while observing the nanowires in solution. It appeared that a frequency of around 5 kHz performed well for the nanowires in the lower dielectric constant solvents. Hence, this frequency was used for assembly of the nanowires across the electrodes in the test array. FIG. 11 shows successfully assembled nanowires across the test electrodes using 42 volts peak to peak @ 5 kHz in butanol post barium carbonate removal. The linear density of the as assembled nanowires is found to be approximately 19 NWs/mm across 27 rows of nanowires. After assembly, the upper electrical contacts were formed with the nanowires via lithography and deposition of upper electrical contacts via copper electroplating as shown in FIG. 12. In particular, FIG. 12 provides a flow diagram illustrating a formation of upper electrical contacts across the nanowires in accordance with embodiments of the present disclosure via 1) patterning of Ti/Cu electrode patterns via sputtering and lift-off; spin coat blanket layer of LOR resist; assemble nanowires; 2) spin coating and patterning AZ1512 photoresist to expose ends of the nanowires; 3) electroplating copper to make electrical contacts with nanowire; and 4) stripping of the remaining photoresist.

The resultant linear density of the nanowire assembly post electrode deposition decreased to 3.6 NWs/mm. During deposition of the upper electrical contacts, this decrease in nanowire density can be attributed to the fact that some nanowires were not sufficiently long enough to be covered by the upper contacts, and loss of adhesion in the upper electrodes. While this density was sufficient to test the concept of using these nanowires to form a passive magnetoelectric nanowire antenna array and should allow for miniaturization, methods to produce a higher density of assembly will be the focus on ongoing research, to allow fabrication of devices with even smaller footprints. A higher density assembly could likely be achieved through the use of alternative solvents or further tuning of the assembly frequency, or the implementation of a microfluidic channel. To increase the proportion of nanowires which remain assembled across the electrodes through the process of depositing upper electrical contacts the proportion of the nanowires long enough to be covered by the electrodes could be increased. To do so the electrospinning parameter space could be further explored to increase the average length of the electrospun nanowires while maintaining a low variance in their distribution. To help adhesion of the upper contacts the surface of the chip or wafer could be cleaned via carbon dioxide snow cleaning after photolithography and before electrode deposition, between steps 2 and 3 in FIG. 12.

Since the AC electrical technique is conducive to assembling discrete nanowires 110 in solution, continuous fibers formed during electrospinning are to be broken into shorter nanowires. A method found to work well for this purpose is increasing the ramp rate during the burn off of the polymer post electrospinning and introducing salt into the annealing process. The increased ramp rate increases the rate at which the polymer is burned off from the nanofibers, thereby, increasing the rate at which the fibers shrink as well as the resulting tension during this process. This tension in turn causes the fibers to break apart axially forming discrete nanowires 110. The introduction of salt during the annealing process prevents nearby wires from sintering together.

For subsequent assembly, a nanowire slightly longer than the electrode gap may be desirable since the nanowire must bridge the electrode gap for electrical connections to be made and nanowires which are too long may quickly settle out of solution. As such, electrospinning and calcination parameters which can provide control of the nanowire lengths may be considered. Two such parameters are the electrospinning voltage and the calcination ramp rate (as discussed with respect to FIGS. 3-5). While these are not the only parameters which could control nanowire length, they are readily tuned and are likely generalizable to other systems. After assembly, upper electrical contacts can be created using lithography, sputter coating, and electroplating, in various embodiments. Additional improvements can be made to the electrospinning, electrical assembly, and upper electrode formation parameters to maintain reliable device fabrication in increasingly smaller electrode footprints, allowing even smaller devices to be manufactured. Furthermore, in some embodiments, all processing steps on the wafer are designed to be performed at low temperature, and thus, these devices can be readily integrated with on chip signal processing components with the potential to further reduce device size.

For an exemplary method for electrical assembly of Janus magnetoelectric nanofibers, after salt calcination, the salt is dissolved and the nanowires are immersed in a beaker of water. After which, a permanent magnet can be used to attract the nanowires to the bottom of the beaker. In one exemplary embodiment, excess water is decanted, and the nanowires are placed in dialysis tubing, and dialyzed in deionized water to remove the salt. For such water assemblies, 5 mg of citric acid can be added, subsequently raising the pH of the solution to a value of around 9 to better suspend the nanowires. Alternatively, for embodiments utilizing ethanol, 2-methoxyethanol, and/or butanol solvent solutions, the nanowires 110 can be placed in a centrifuge tube and nearly all of the water from the nanowires may be decanted while holding the nanowires in place with a permanent magnet. The nanowires may then be dried in a vacuum oven and the respective solvent added. The solution can then be sonicated and vortexed.

For embodiments utilizing a copper coated nanowire assembly, the nanowires can be first coated in a 100 nm sacrificial copper coating by evaporating nanowires suspended in isopropyl alcohol on microscope slides. Then, sputter coating may be applied to the nanowires on the slides. The glass slides may be sonicated in water to remove the nanowires from the slides. The nanowires may be better dispersed in the deionized water with the addition of citric acid and sodium hydroxide. For subsequent assembly across several rows of nanowires in series (series array), butanol may be used as the nanowire solvent solution.

During trials, initial assembly attempts of Janus nanowires in water, even after barium carbonate removal, were relatively unsuccessful with a weak dielectrophoretic force attracting the nanowires to the electrode gaps. However, barium titanate nanofibers ground with a mortar and pestle post barium carbonate removal exhibited strong positive dielectrophoresis, which suggests that the relatively low permittivity of cobalt ferrite decreases the dielectrophoretic force to a large extent.

After forming the sacrificial copper coating to make the magnetoelectric nanowires more conductive, successful assembly may be achieved at low frequencies. Thus, the permittivity of the nanowire solvent solution relative to the nanowires was sought to be decreased to promote assembly.

It follows that given a sufficiently good copper coating, the magnetoelectric nanowires can be assembled at lower frequencies, and the can could be successfully removed using a sodium hydroxide and copper sulfate solution. However, by changing to a lower dielectric constant solvent for assembly, such as butanol, assembly at higher frequencies (~5 kHz) in lieu of the copper coating may also be performed. Nonetheless, a sacrificial metal coating approach might also prove useful for other material systems.

Figure 13:
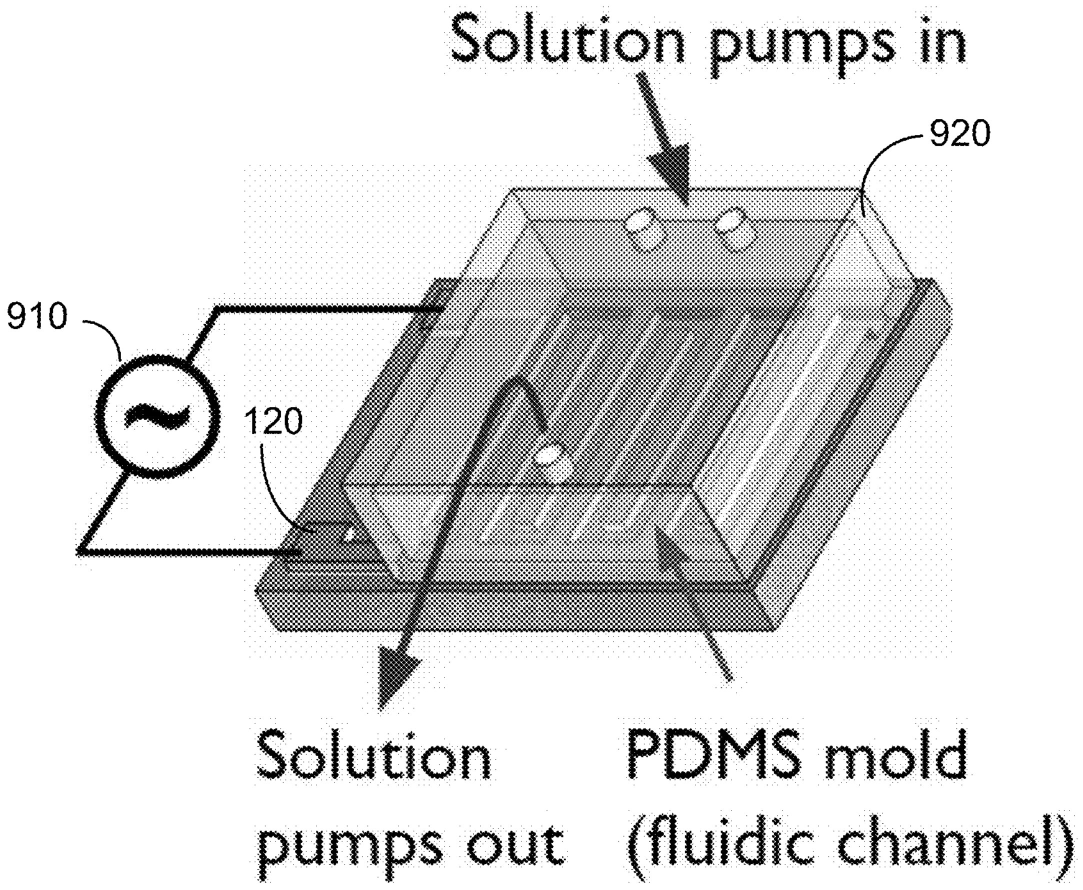
FIG. 13 is a diagram of an embodiment of an electrical assembly of a magnetoelectric nanowire antenna array in accordance with embodiments of the present disclosure.
Figure 14:
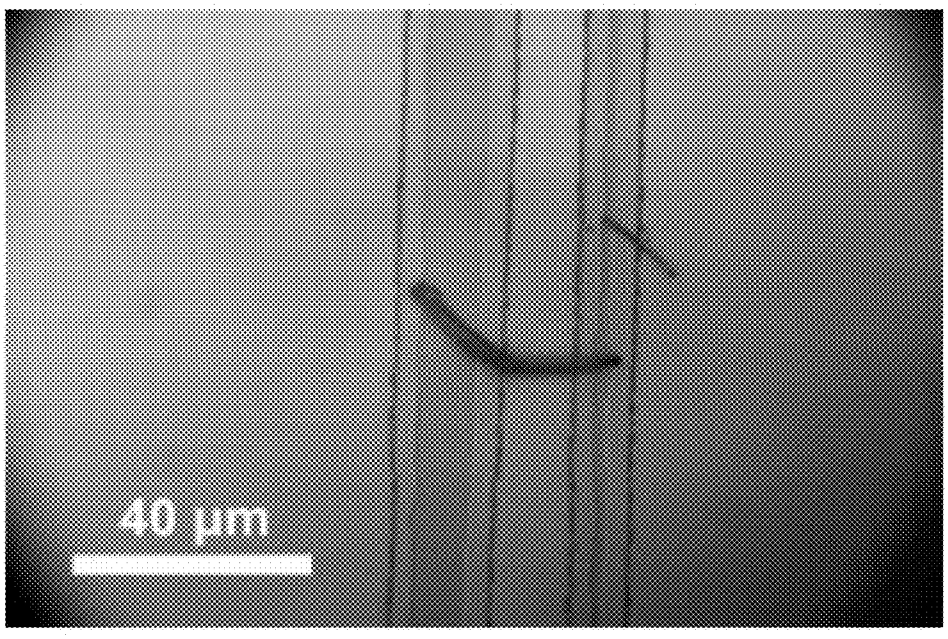
FIG. 14 is an image of the positioning of a magnetoelectric nanowire across an electrode gap in accordance with embodiments of the present disclosure.

Referring to FIG. 13, a diagram of an embodiment of an electrical assembly of a magnetoelectric nanowire antenna array 100 in accordance with the present disclosure is depicted. In the figure, an AC voltage source 910 is coupled to contacts of the electrodes 120, such as inter-digitated electrodes in one embodiment. A chamber 920 is positioned over a portion of the electrodes 120 that allow for a solvent to be pumped in and out of the chamber 920. In one embodiment, the chamber may be in the form of a PDMS mold. Accordingly, a solvent may be added to the chamber 920 in addition with nanowires 110. The solvent is provided to enable the nanowires 110 to be arranged across the electrode gap that separates the electrodes 120, as demonstrated in FIG. 14. After the nanowires are arranged, the solvent may be pumped out or removed from the chamber 920 and the AC voltage source 910 may be removed.

During the electrical assembly, a droplet of the nanowire solvent solution can be placed over an electrode array in an exemplary embodiment, among others. For an exemplary assembly of magnetoelectric nanowires in parallel across interdigitated electrodes, an AC voltage source in the form of a function generator can be set to supply a sinusoidal voltage of 20 Vpp from 100 Hz-10 MHz. During trials, the function generator was set to 5 kHz for a final assembly of non-copper coated wires and 100 Hz for a copper coated nanowire assembly. In an alternative embodiment involving a series array, a pulse generator capable of producing a voltage of 42 Vpp at 5 kHz was used during assembly of the nanowire fibers over the electrode gap, in some trials. After nanowire assembly, upper electrode contacts were formed with the nanowires via spin coating AZ1512 photoresist, optical lithography and removal of photoresist from the ends of the nanowires, electroplating copper, and stripping of the remaining photoresist.

To achieve magnetoelectric nanowire-based ultra-compact antennas, in one embodiment, biphasic (PZT/$NiZnFe_2O_4$) magnetoelectric nanowires are assembled into functional arrays using dielectrophoresis onto interdigitated electrodes, as previously described in FIG. 1A. During one trial, the gap between the electrodes in this first generation array was set at 10 microns. However, to tune the frequency response of the magnetoelectric nanowire-based antenna array, both the dimensions of the nanowire and the electrode spacing can be varied in accordance with the present disclosure. Thus, arrays of magnetoelectric nanowires can be synthesized and assembled with varying aspect ratios (length/diameter) in order to configure or tune the mechanical resonance and thus the operating range of the antenna device 100.

Figure 15A:
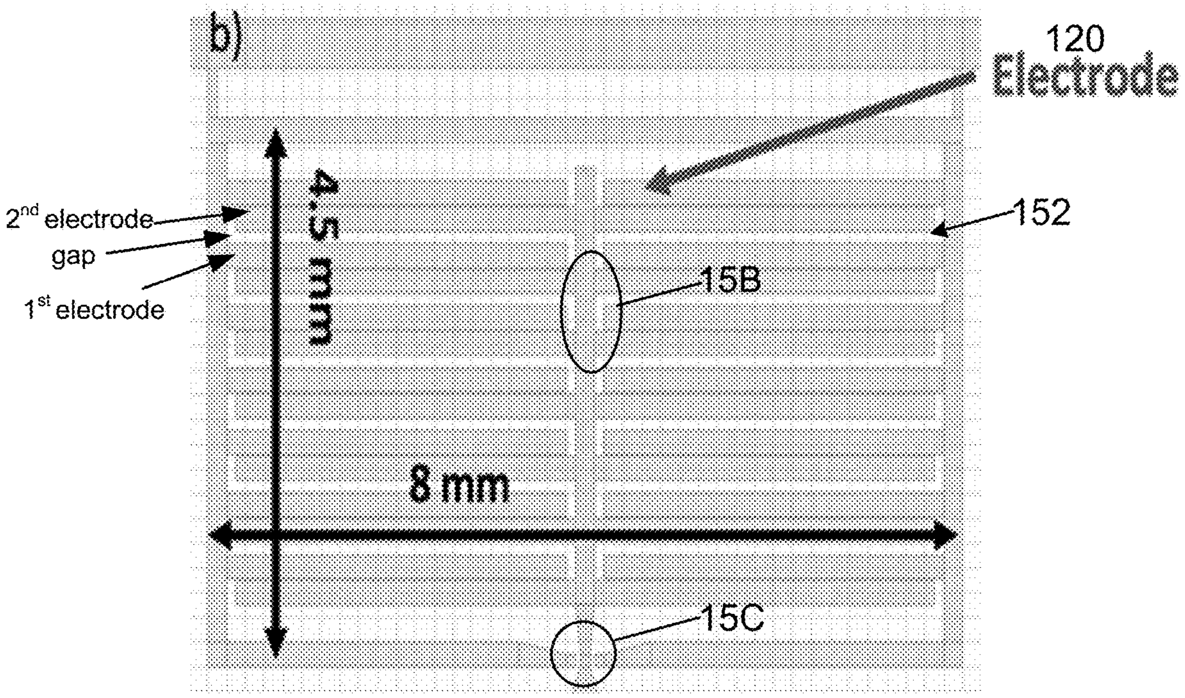
FIGS. 15A-15C are schematics of an embodiment of the interdigitated electrode of the magnetoelectric nanowire antenna array device in accordance with embodiments of the present disclosure.

Referring to FIG. 15A, a schematic of an embodiment of an electrode 120 of the magnetoelectric nanowire antenna array device 100 is depicted. Here, the electrode is part of a set of inter-digitated electrodes (referred as $1^{st}$ electrode and $2^{nd}$ electrode in the figure) which has an 8 mm by 4.5 mm electrode design. There are also gaps 152, among others, between the electrodes that approximates the size of the lengths of magnetoelectric nanowires 110 (10 um) as part of the antenna design. In accordance with the present disclosure, this gap width/nanowire size can be adjusted to change the resonance and hence operating region of the nanowire antenna array device 100. Accordingly, the length of nanowires 110 and width of electrode gaps 152 are important in determining the mechanical resonance of the nanowires 110 which will determine the operating range of the antenna 100. Additionally, the mechanical resonance may also be changed or tuned by adjusting a diameter of the magnetoelectric nanowire and/or the DC magnetic bias field. In the latter instance, the DC magnetic bias field can create tension or compression within the magnetostrictive phase of the nanowires 110.

Figure 15B:
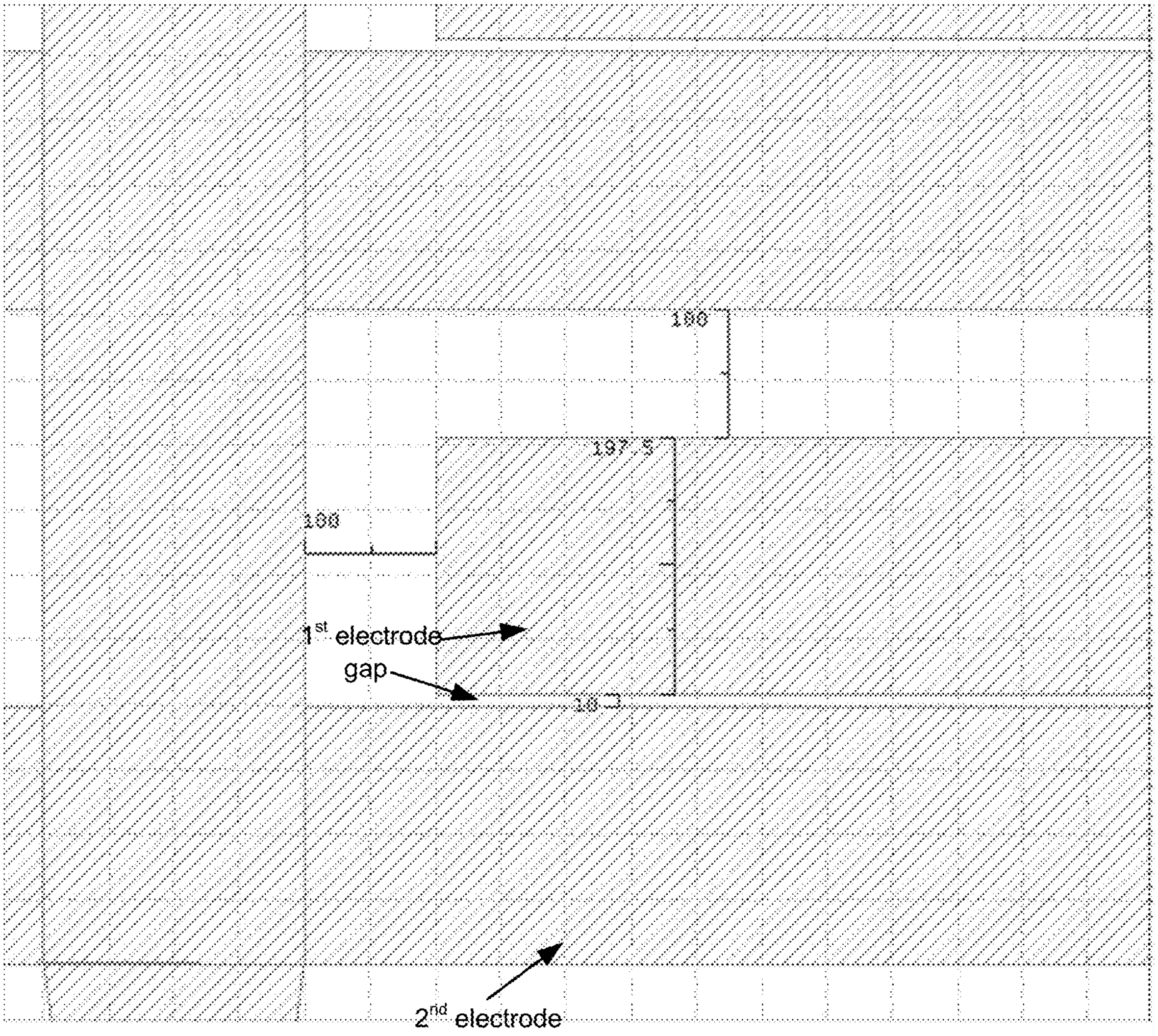
Figure 15C:
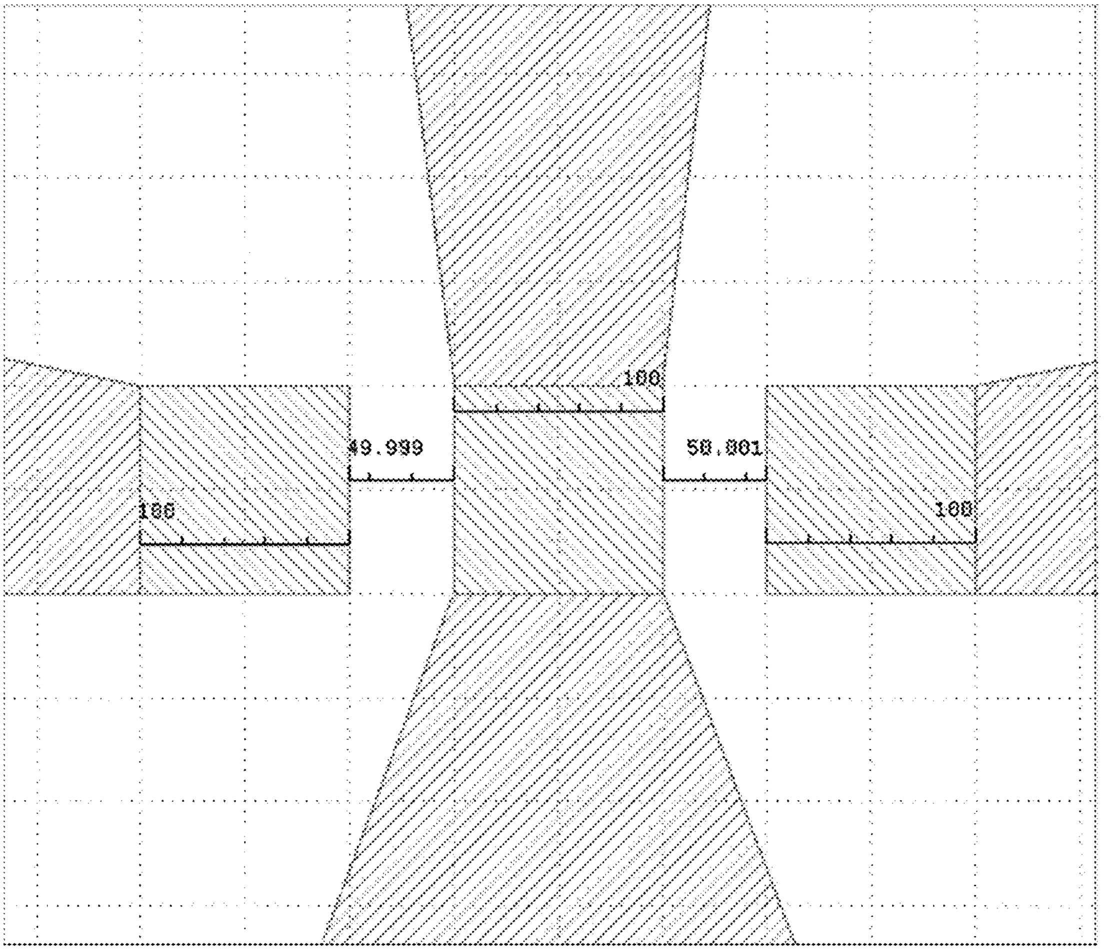

In various embodiments, individual nanowires 110 form pairs of loops within the antenna circuit which will minimize induction and aid in reception/transmission of electromagnetic signals. Exploded sections of the schematic of FIG. 15A are shown in respective FIG. 15B (denoted by reference character 15B in FIG. 15A) and FIG. 15C (denoted by reference character 15C in FIG. 15A).

Figure 16:
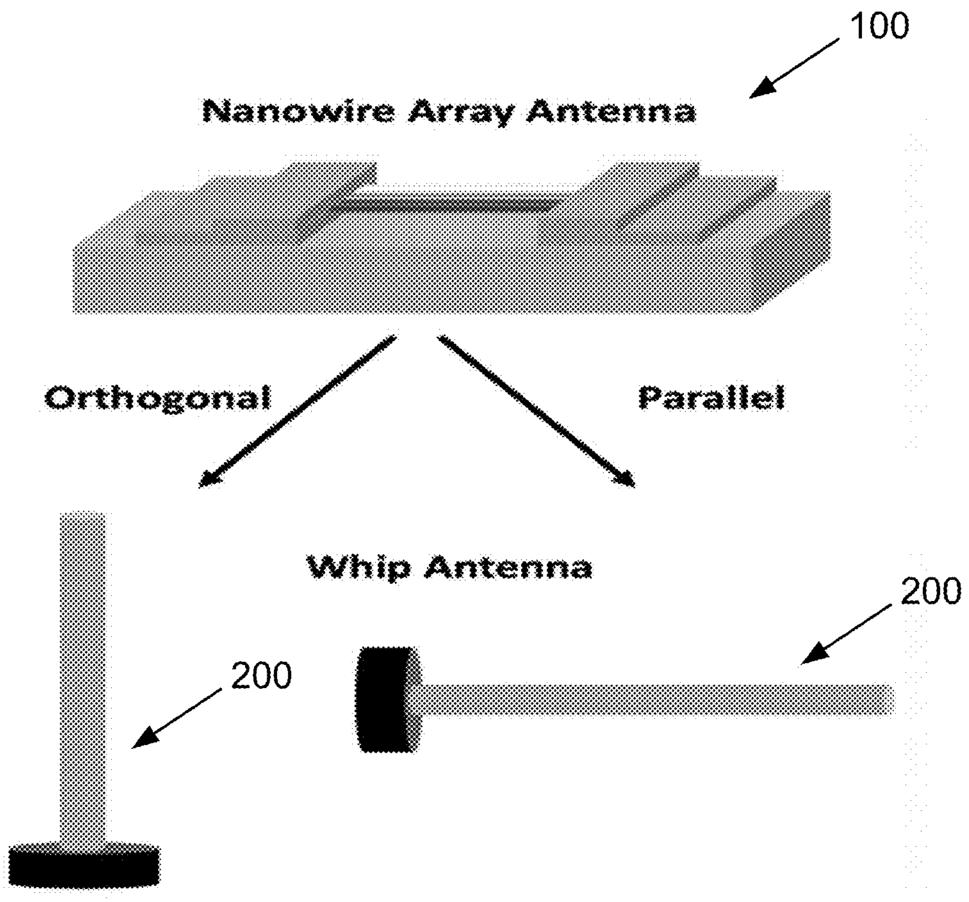
FIG. 16 depicts a set-up for testing a performance of an embodiment of the magnetoelectric nanowire antenna array device, where the nanowire antenna array device is measured both broadside (parallel) and longitudinally (orthogonal) with respect to a VHF whip antenna.

Next, preliminary experimental measurements of an exemplary embodiment of the magnetoelectric nanowire antenna array device in the VHF range are discussed. In FIG. 16, a schematic of the test set-up is presented, where the nanowire antenna array 100 is measured both broadside (parallel) and longitudinally (orthogonal) with respect to a VHF whip antenna 200. The two-port vector network analyzer (VNA) results are shown in FIGS. 17A-17C for the orthogonal configuration, in which the nanowire antenna array device is considered as Antenna 1 or Port 1 and the whip antenna is considered as Antenna 2 or Port 2.

Figure 17A:
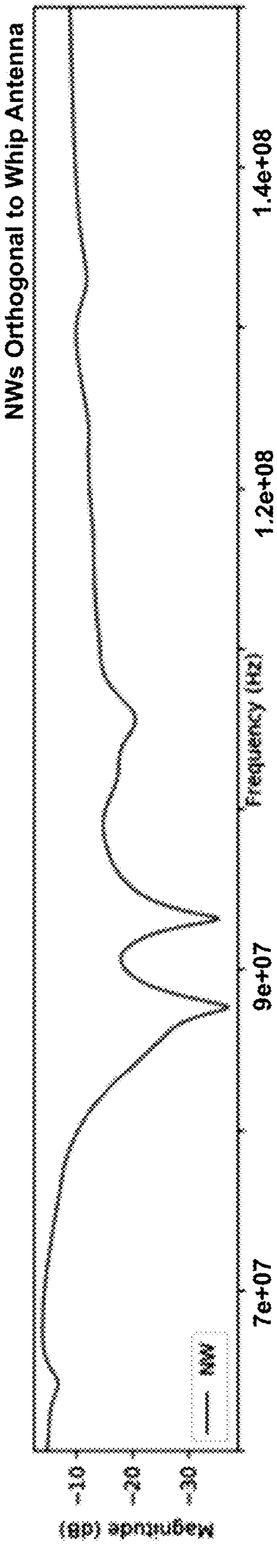
FIGS. 17A-17C respectively display S11, S22, and S12/S21 parameter measurements for the magnetoelectric nanowire (NW) antenna array and VHF whip antenna for the set-up arrangement provided in FIG. 16 in accordance with embodiments of the present disclosure in which the magnetoelectric nanowire antenna array is oriented orthogonal to the whip antenna.

Accordingly, for the orthogonal orientation, the S11 parameter measurements on the magnetoelectric nanowire (NW) antenna array 100 is shown in FIG. 17A. The S11 parameter is effectively a ratio, a/b, of the voltages of the signal reflected back from the nanowire array to the network analyzer used in the measurements, a, to the power sent from the network analyzer, b. Here, the value in dB for S11 is defined as dB=20*log(S11(magnitude)). In FIG. 17A, the S11 of the nanowire antenna 100 is below −10 dB in the range 80 MHz and 140 MHz, indicating that little power was reflected back from the antenna in this frequency range and thus our current nanowire array appears to be a very efficient FM radio antenna.

Figure 17B:
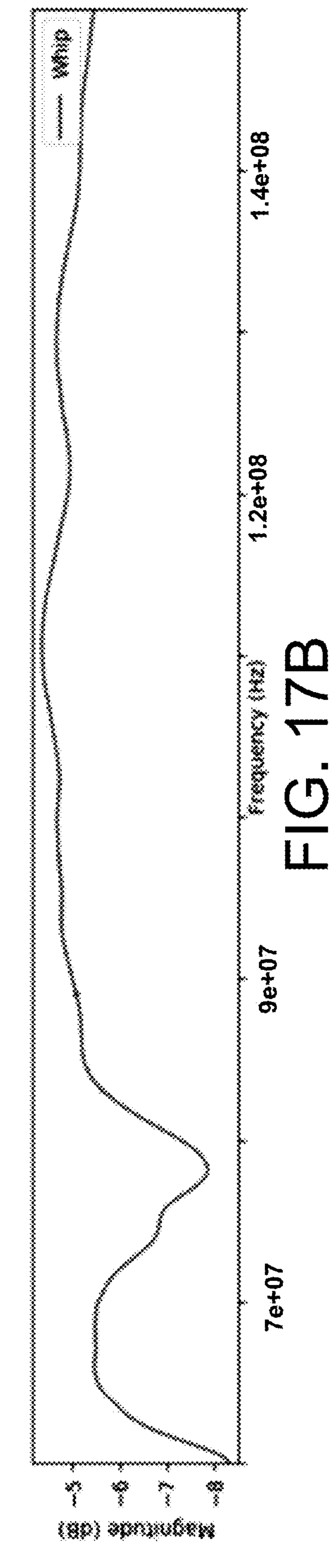
Figure 17C:
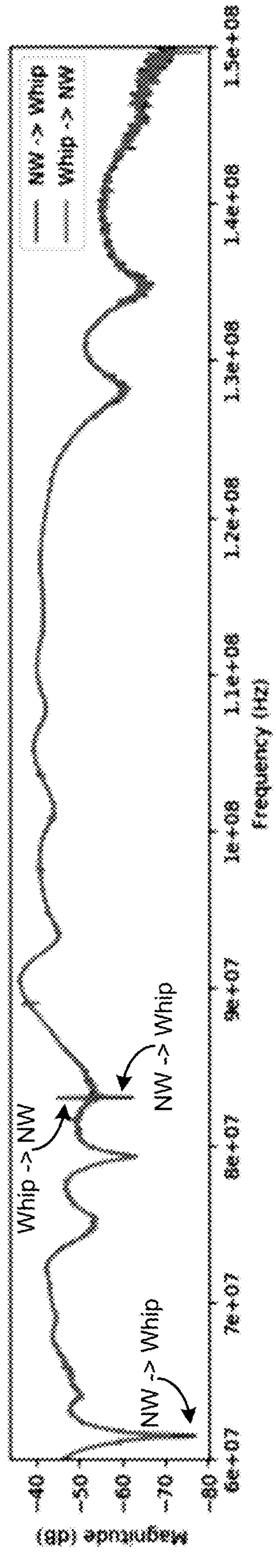
Figure 18A:
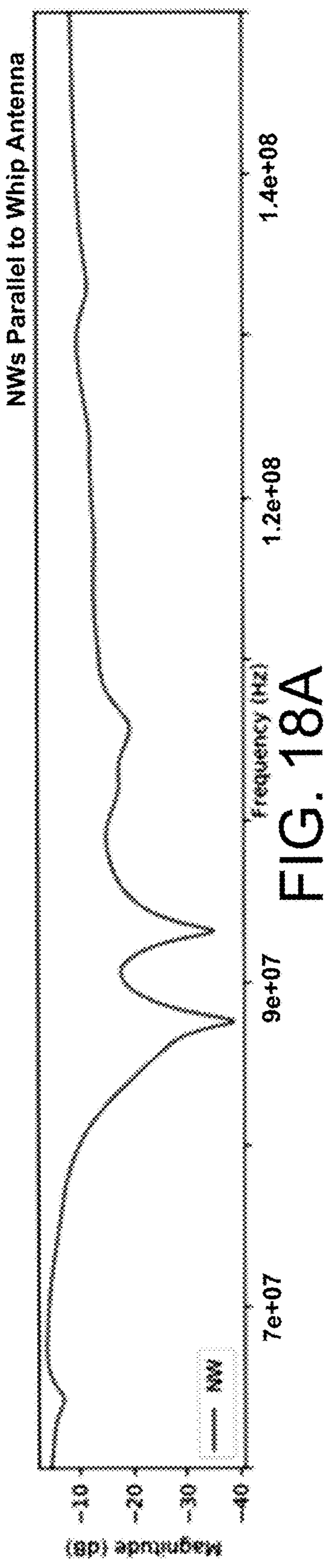
FIGS. 18A-18C respectively display S11, S22, and S12/S21 parameter measurements for the magnetoelectric nanowire (NW) antenna array and VHF whip antenna for the set-up arrangement provided in FIG. 16 in accordance with embodiments of the present disclosure in which the magnetoelectric nanowire antenna array is oriented parallel to the whip antenna.
Figure 18B:
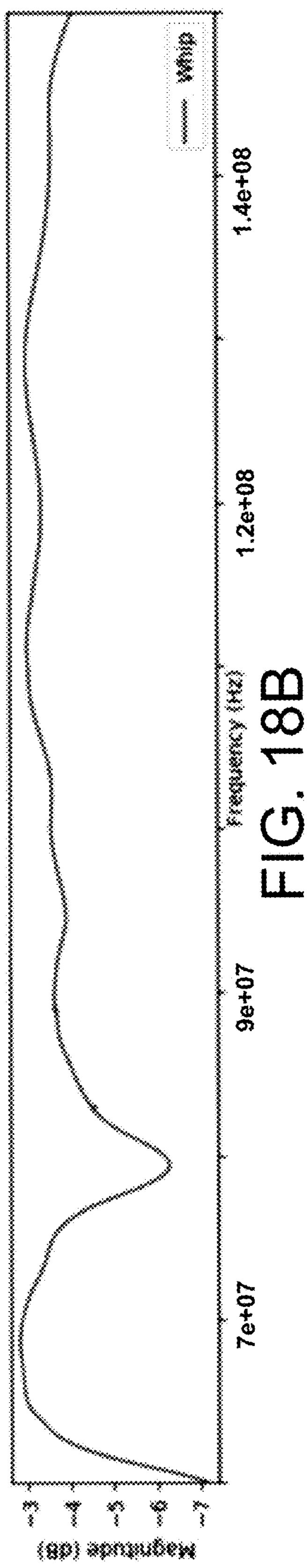
Figure 18C:
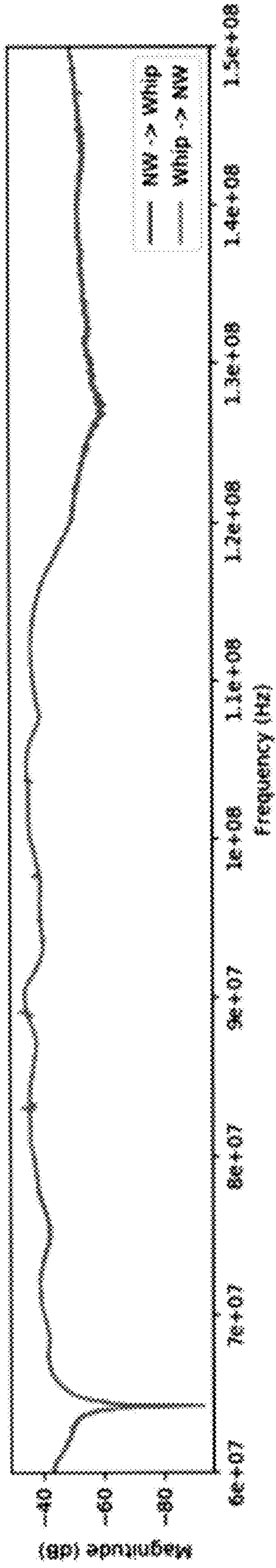

Additionally, the S22 measurements of the whip antenna 200 is provided in FIG. 17B, while FIG. 17C displays the S12 and S21 measurements of the magnetoelectric nanowire array antenna's communication with the whip antenna 200, which establish that the nanowire array 100 was indeed transmitting and receiving a signal during testing. In particular, the S12 parameter is, effectively, the ratio of the voltage received by the nanowire array 100 to that sent from the whip antenna 200, again reported in log scale. Accordingly, the S12 and S21 parameters show strong interaction of the two antennas 100, 200 across the tested range. These results indicate that the nanowire antenna array 100 is capable of transmitting and receiving signals from a nearby conventional whip antenna 200. Correspondingly, FIG. 18A displays the S11 measurements for the magnetoelectric nanowire antenna array 100 with the whip antenna 200 oriented parallel to the direction of the radius of the nanowires, FIG. 18B displays the S22 measurements for the whip antenna 200 under this orientation, and FIG. 18C displays the respective S12 and S21 measurements.

As a result, a magnetoelectric nanowire antenna array device 100 of the present disclosure can be utilized to great effect in a wireless communication system. For example, in one trial, an embodiment of the magnetoelectric nanowire antenna array 100 was integrated within a radio receiver having a R820T2 tuner silicon chip and RTL2832U demodulator to test if FM radio signals could be received with the magnetoelectric nanowire antenna array 100 in the RF range. From testing, it was successfully determined that the magnetoelectric nanowire antenna array 100 was able to receive clear radio broadcasts from FM radio stations.

Figure 19:
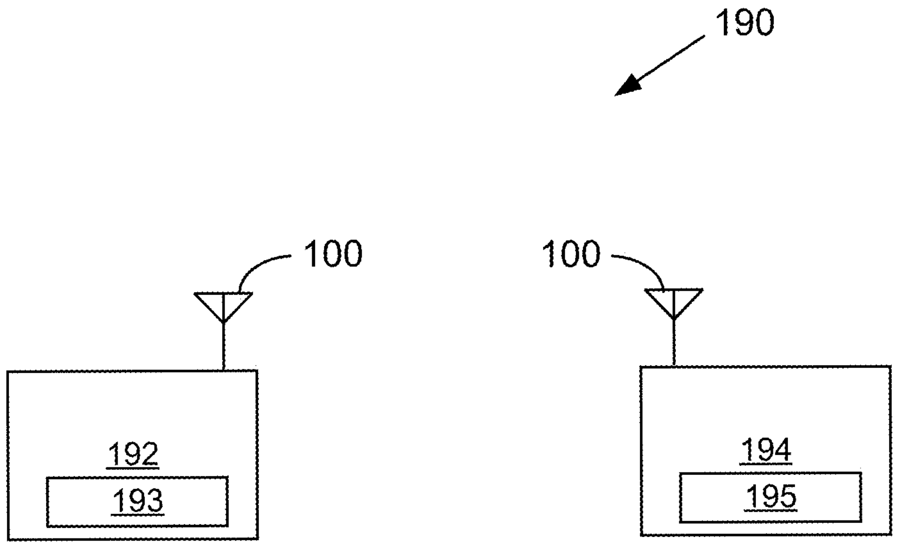
FIG. 19 depicts a block diagram of an exemplary wireless communication system utilizing the magnetoelectric nanowire antenna array device in accordance with embodiments of the present disclosure.

Referring now to FIG. 19, an embodiment of an exemplary wireless communication system 190 in accordance with the present disclosure is depicted. In this arrangement, a radio transmitter 192 is shown with an embodiment of a magnetoelectric nanowire antenna array device 100 in accordance with the present disclosure. In various embodiments, the antenna array device 100 may be configured to have an impedance at a specific value such as 50 or 75 ohms. The transmitter 192 includes circuitry 193 that allows it to operate including the following stages of operation, in some embodiments: formatting of source information, encryption, channel encoding, multiplexing of signals, digital modulation, multiple access staging, and/or conversion of output signal to selected RF frequencies & amplification before transmission with the antenna array 100.

A radio receiver 194 is also shown with an embodiment of a magnetoelectric nanowire antenna array device 100 in accordance with the present disclosure. The receiver 194 includes circuitry 195 that allows it to operate including the following stages of operation, in some embodiments: amplification & conversion to an intermediate frequency after reception of an RF signal, multiple access staging, digital demodulation, demultiplexing of signals, channel decoding, decryption, and/or decoding the source information.

Accordingly, during transmission of a RF signal, a voltage signal generated by the transmitter circuitry 193 produces a mechanical strain on the magnetoelectric structure of the antenna 100 and induces a magnetic current that radiates an electromagnetic wave (RF signal) over VHF and/or UHF radio frequencies. Conversely, during reception of an electromagnetic signal over VHF and/or UHF radio frequencies, the electromagnetic signal (RF signal) causes the magnetoelectric structure of the antenna array 100 to vibrate and piezoelectrically generate a voltage signal. It is noted that the magnetoelectric nanowire antenna array device 100 is passive and does not require a power source to operate as a receiver which is an attractive feature in many possible applications.

In accordance with the present disclosure, an embodiment of a magnetoelectric nanowire antenna array device 100 for a wireless communication system 190 is fabricated via the assembly of arrays of magnetoelectric nanowires 110 using methods that are readily scalable, economical, and CMOS compatible. Exemplary magnetoelectric nanowires with controllable lengths can be prepared by tuning both the electrospinning and calcination conditions and that dielectrophoretic assembly methods allow the fabrication of functional arrays of magnetoelectric nanowires. In various embodiments, by utilizing magnetoelectric nanowires suspended across electrodes above the substrate, substrate clamping is reduced when compared to layered thin-film architectures; this results in enhanced magnetoelectric coupling. Exemplary Janus magnetoelectric nanowires may be fabricated by sol-gel electrospinning, and their length controlled through the electrospinning and calcination conditions. Using a directed nanomanufacturing approach, the nanowires may then be assembled onto pre-patterned metal electrodes on a silicon substrate using dielectrophoresis. Using this process, functional magnetoelectric nanowire antenna arrays 100 can be formed by connecting many magnetoelectric nanowires in parallel across electrodes at various nanowire lengths and electrode gap widths. From testing, the observed magnetic field sensitivity from such a parallel array of magnetoelectric nanowires is 0.514±0.027 mV $Oe^{-1}$ at 1 kHz, which translates to a magnetoelectric coefficient of 514±27 mV $cm^{-1}$ $Oe^{-1}$.

Herein, the present disclosure describes various fabrication techniques and passive ultra-compact antenna designs using 1-D magnetoelectric nanostructures. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

Therefore, at least the following is claimed:

1. A method comprising:

using a dielectrophoretic force to orient a magnetoelectric nanowire across an electrode gap separating a pair of electrodes; and transmitting or receiving electromagnetic waves through a magnetoelectric effect of the magnetoelectric nanowire.

2. The method of claim 1, wherein the magnetoelectric nanowire operates at a mechanical resonance.

3. The method of claim 2, further comprising:

changing a mechanical resonance frequency by adjusting a width of the electrode gap or a length of the magnetoelectric nanowire.

4. The method of claim 3, further comprising:

changing the mechanical resonance frequency with a DC magnetic bias field.

5. The method of claim 3, further comprising:

changing the mechanical resonance frequency by adjusting a diameter of the magnetoelectric nanowire.

6. The method of claim 1, further comprising:

receiving electromagnetic waves through the magnetoelectric effect of the magnetoelectric nanowire at its mechanical resonance frequency.

7. The method of claim 1, wherein the magnetoelectric nanowire is oriented with a solvent across the electrode gap using the dielectrophoretic force.

8. The method of claim 1, further comprising forming a sacrificial metal coating on the magnetoelectric nanowire.

9. The method of claim 1, wherein the magnetoelectric nanowire comprises a Janus morphology or a core shell morphology.

10. The method of claim 1, wherein the magnetoelectric nanowire comprises a piezoelectric material coupled with a magnetostrictive material.

11. The method of claim 10, wherein the piezoelectric material coupled with the magnetostrictive material comprises barium titanate coupled with cobalt ferrite.

12. The method of claim 10, wherein the piezoelectric material coupled with the magnetostrictive material comprises PZT (lead zirconate titanate) coupled with NZF (nickel zinc ferrite).

13. The method of claim 1, wherein the magnetoelectric nanowire comprises a randomly dispersed morphology or a multistrand morphology.

14. The method of claim 1, wherein the pair of electrodes form inter-digitated electrodes.

15. The method of claim 1, further comprising assembling an array of magnetoelectric nanowires on a plurality of electrodes, wherein the array of magnetoelectric nanowires include the magnetoelectric nanowire that is oriented across the electrode gap separating the pair of electrodes.

16. The method of claim 15, further comprising integrating the array of magnetoelectric nanowires in a radio receiver.

17. The method of claim 1, wherein the magnetoelectric nanowire comprises a loop.

18. A nanowire antenna array device comprising:

a first electrode positioned across a second electrode, wherein an electrode gap separates the first electrode and the second electrode;

a dielectrophoretic magnetoelectric nanowire connected to the first electrode and the second electrode across the electrode gap without substrate clamping;

wherein the dielectrophoretic magnetoelectric nanowire comprises a piezoelectric material coupled with a magnetostrictive material; and wherein the nanowire antenna array device receives or transmits electromagnetic waves through a magnetoelectric effect.

19. The nanowire antenna array device of claim 18, wherein the nanowire antenna array device operates at a mechanical resonance.

20. The nanowire antenna array device of claim 18, wherein the dielectrophoretic magnetoelectric nanowire comprises a Janus morphology or a core shell morphology.

* * * * *